US00RE49417E

(19) United States
(12) Reissued Patent
Kurashige

(10) Patent Number: US RE49,417 E
(45) Date of Reissued Patent: *Feb. 14, 2023

(54) INFORMATION PROCESSING APPARATUS AND CACHE CONTROL METHOD

(71) Applicant: Kioxia Corporation, Tokyo (JP)

(72) Inventor: Takehiko Kurashige, Ome-shi (JP)

(73) Assignee: KIOXIA Corporation, Tokyo (JP)

( * ) Notice: This patent is subject to a terminal disclaimer.

(21) Appl. No.: 15/073,618

(22) Filed: Mar. 17, 2016

Related U.S. Patent Documents

Reissue of:
(64) Patent No.: 8,677,061
Issued: Mar. 18, 2014
Appl. No.: 13/333,795
Filed: Dec. 21, 2011

(30) Foreign Application Priority Data

Jun. 2, 2011 (JP) ..... 2011-124542

(51) Int. Cl.
*G06F 12/00* (2006.01)
*G06F 12/0871* (2016.01)
*G06F 12/0864* (2016.01)
*G06F 12/0866* (2016.01)

(52) U.S. Cl.
CPC ..... *G06F 12/0871* (2013.01); *G06F 12/0864* (2013.01); *G06F 12/0866* (2013.01); *G06F 2212/217* (2013.01); *G06F 2212/222* (2013.01)

(58) Field of Classification Search
CPC ..... G06F 12/0871; G06F 12/0866; G06F 12/0864; G06F 2212/217; G06F 2212/222
USPC ..... 711/113, 103
See application file for complete search history.

(56) References Cited

U.S. PATENT DOCUMENTS 5,420,998 A * 5/1995 Horning ..... G06F 12/0866 711/E12.019
5,577,226 A * 11/1996 Percival ..... G06F 12/0813 711/146
5,860,083 A 1/1999 Sukegawa
7,603,516 B2 * 10/2009 Allen ..... G06F 3/0613 365/200
7,620,773 B2 11/2009 Nicholson et al.
(Continued)

FOREIGN PATENT DOCUMENTS

JP 10-040170 2/1998
JP 10-154101 6/1998
(Continued)

OTHER PUBLICATIONS

Japanese Patent Application No. 2011124542, Notice of Reasons for Rejection, dated Sep. 18, 2012, (with English Translation).

*Primary Examiner* — B. James Peikari
(74) *Attorney, Agent, or Firm* — Finnegan, Henderson, Farabow, Garrett & Dunner, LLP

(57) ABSTRACT

According to one embodiment, an information processing apparatus includes a storage device, a volatile memory, and a processor. The storage device includes a controller, a first nonvolatile storage module, and a second nonvolatile storage module whose access speed is higher than an access speed of the first nonvolatile storage module. The processor is configured to execute an operating system and a cache driver that are loaded into the volatile memory. The cache driver uses at least part of an area in the second nonvolatile storage module as a cache for the first nonvolatile storage module.

14 Claims, 25 Drawing Sheets

(56) References Cited

U.S. PATENT DOCUMENTS

| | | | | |
|---|---|---|---|---|
| 7,757,041 | B2 * | 7/2010 | Yoshida | G06F 12/0866 711/113 |
| 7,853,762 | B2 * | 12/2010 | Lee et al. | 711/159 |
| 8,195,878 | B2 * | 6/2012 | Mittendorff | G06F 12/0866 711/100 |
| 8,473,675 | B2 * | 6/2013 | Miyazaki | G06F 12/0246 711/113 |
| 2004/0268026 | A1 * | 12/2004 | Royer, Jr. | G06F 12/0802 711/104 |
| 2008/0010401 | A1 * | 1/2008 | Royer et al. | 711/113 |
| 2009/0087168 | A1 * | 4/2009 | Park et al. | 386/124 |
| 2009/0103203 | A1 * | 4/2009 | Yoshida | G06F 12/0871 360/75 |
| 2010/0017633 | A1 * | 1/2010 | Inoue | 713/320 |
| 2010/0106897 | A1 * | 4/2010 | Yoshimura | 711/103 |
| 2011/0093651 | A1 * | 4/2011 | Kurashige | G06F 3/0608 711/170 |
| 2011/0276743 | A1 | 11/2011 | Kirshenbaum et al. | |
| 2011/0283065 | A1 * | 11/2011 | Kurashige | G06F 12/0804 711/E12.017 |
| 2011/0283066 | A1 * | 11/2011 | Kurashige | G06F 12/0866 711/135 |

FOREIGN PATENT DOCUMENTS

| | | |
|---|---|---|
| JP | 2006-134321 | 5/2006 |
| JP | 2008-538437 | 10/2008 |
| JP | 2010-257481 | 11/2010 |

* cited by examiner

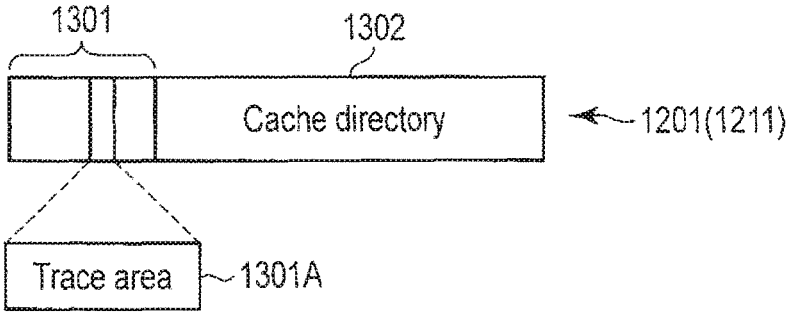
F I G. 13
| Index \ Way | 0 | 1 | 2 | 3 | ‥ | 15 |
|---|---|---|---|---|---|---|
| 0_0000 | | | | | | |
| 0_0001 | | | | | | |
| ⋮ | | | | | | |
| 7_FFFF | | | | | | |
F I G. 14
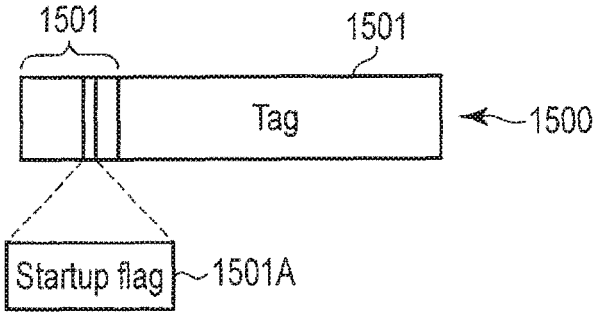
F I G. 15

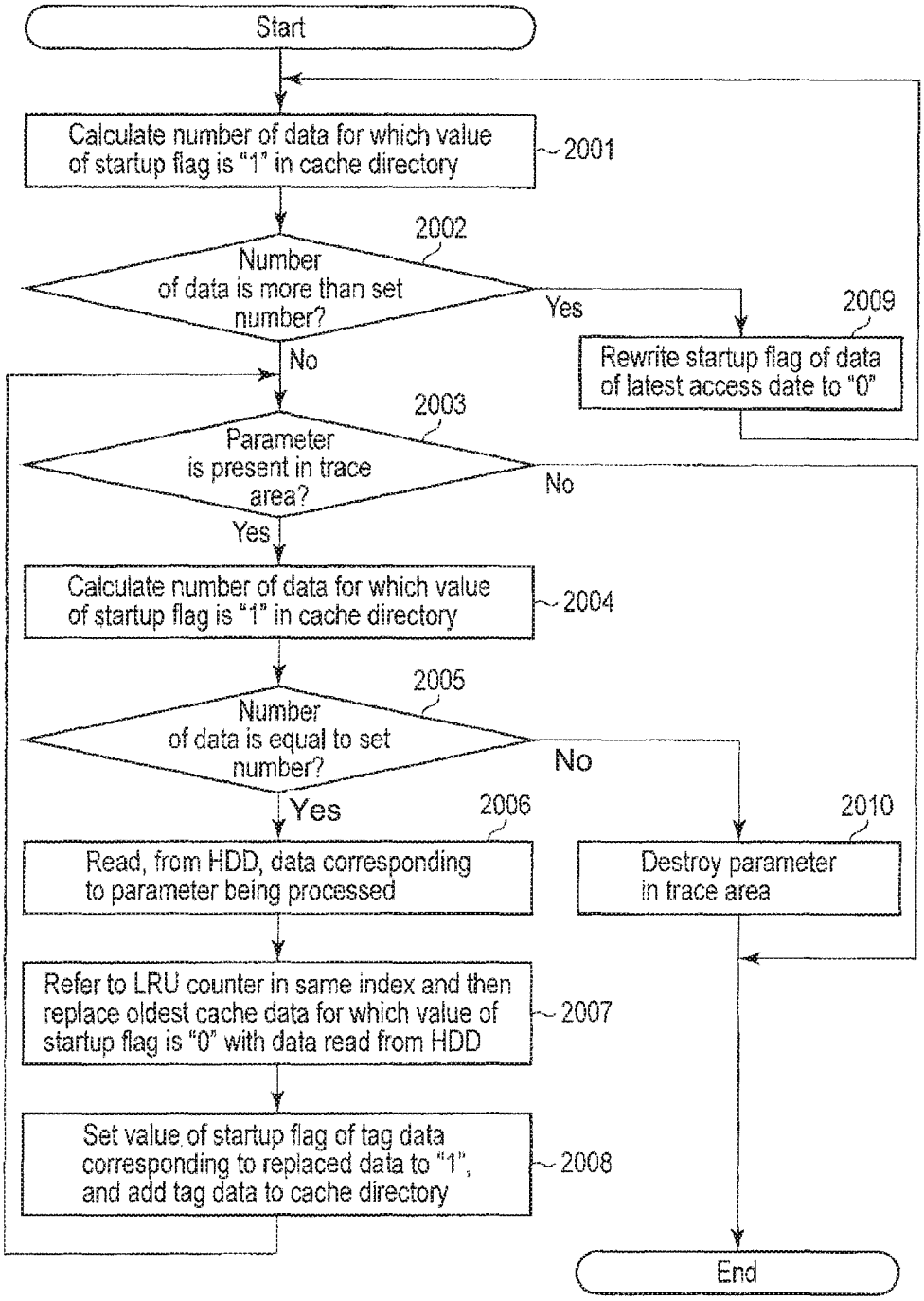
F I G. 20
(amended)

INFORMATION PROCESSING APPARATUS AND CACHE CONTROL METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

[This application ] *This is a reissue of U.S. Pat. No. 8,677,061, issued on Mar. 18, 2014, from U.S. patent application Ser. No. 13/333,795, which* is based upon and claims the benefit of priority from prior Japanese Patent Application No. 2011-124542, filed Jun. 2, 2011[, the]. *The* entire contents of [which] *the above-identified applications* are incorporated herein by reference.

FIELD

Embodiments described herein relate generally to an information processing apparatus used as a cache device, and a cache control method.

BACKGROUND

A hybrid hard disk drive which comprises a hard disk drive and a flash memory and which uses the flash memory as a cache device of the hard disk drive is on the market. The hybrid hard disk drive needs to be provided with a controller having a high computing speed to perform cache control.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 13 is an exemplary diagram showing an example of cache management information generated by an H-HDD driver of the information processing apparatus according to the fourth embodiment.

FIG. 14 is an exemplary diagram showing an example of a cache directory in the cache management information.

FIG. 15 is an exemplary diagram showing an example of tag data in the cache directory.

FIG. 20 is an exemplary flowchart showing an example of a cache control method using the H-HDD driver according to the fifth embodiment.

DETAILED DESCRIPTION

Various embodiments will be described hereinafter with reference to the accompanying drawings.

In general, according to one embodiment, an information processing apparatus comprises a storage device, a volatile memory, and a processor. The storage device comprises a controller, a first nonvolatile storage module, and a second nonvolatile storage module whose access speed is higher than an access speed of the first nonvolatile storage module. The processor is configured to execute an operating system and a cache driver that are loaded into the volatile memory. The cache driver uses at least part of an area in the second nonvolatile storage module as a cache for the first nonvolatile storage module.

Figure 1:
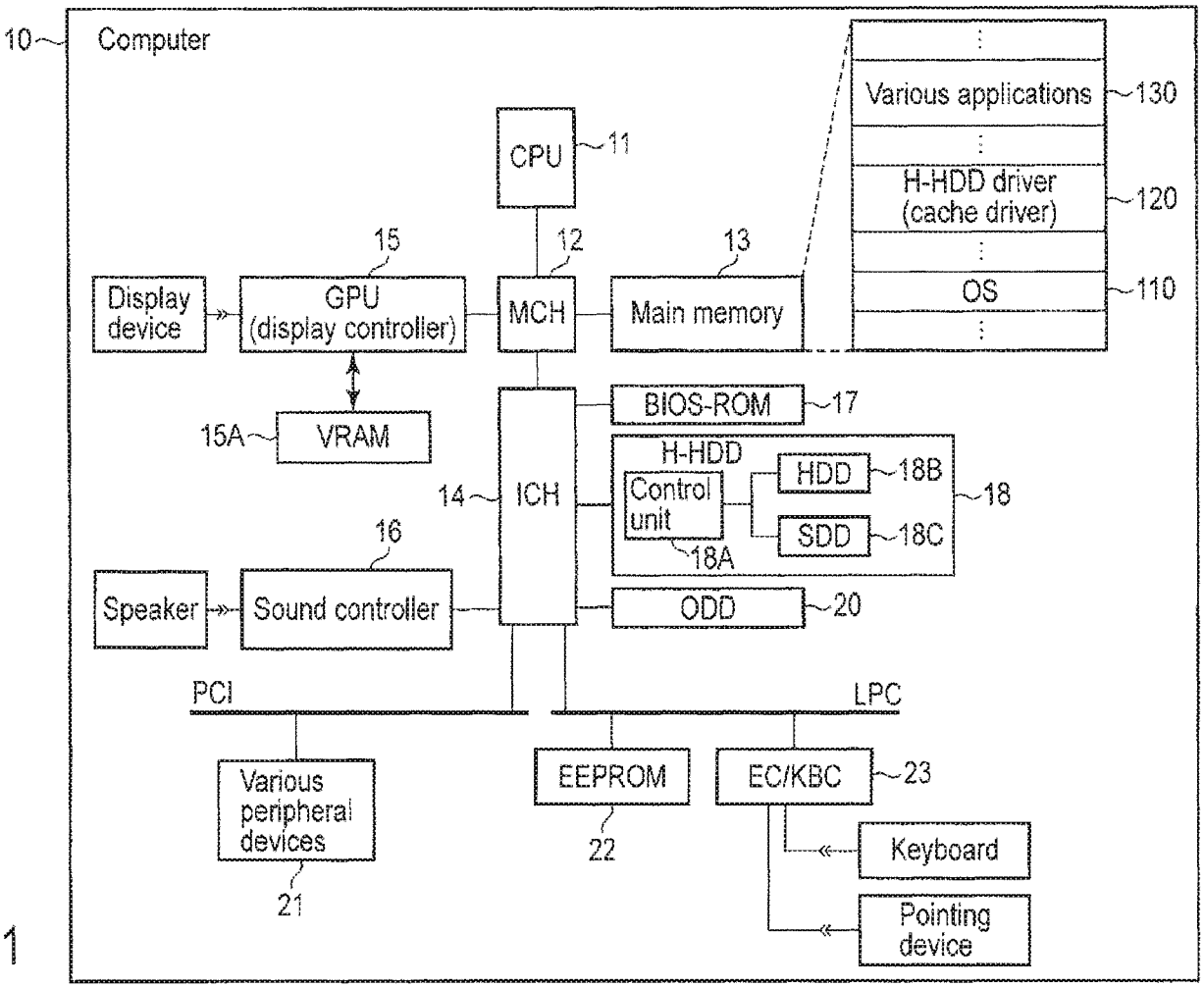
FIG. 1 is an exemplary block diagram showing an example of the configuration of an information processing apparatus according to a first embodiment.

FIG. 1 is a diagram showing a system configuration of an information processing apparatus according to an embodiment. The information processing apparatus according to the present embodiment is provided as a personal computer.

As shown in FIG. 1, this information processing apparatus comprises a central processing unit (CPU) 11, a memory controller hub (MCH) 12, a main memory (volatile memory) 13, an I/O controller hub (ICH) 14, a graphic processing unit (GPU) 15, a video memory (VRAM) 15A, a sound controller 16, a BIOS read only memory (BIOS-ROM) 17, a hybrid hard disk drive (H-HDD) (storage device) 18, an optical disc drive (ODD) 20, various peripheral devices 21, an electrically erasable programmable ROM (EEPROM) 22, and an embedded controller/keyboard controller (EC/KBC) 23.

The CPU 11 is a processor for controlling the operation of this information processing apparatus, and executes various programs loaded into the main memory 13 from the H-HDD 18 and the ODD 20. The various programs to be executed by the CPU 11 include an OS 110 for resource management, and an H-HDD driver (cache driver) 120 and various application programs 130 that are operated under the OS 110. The H-HDD driver 120 is a program for controlling the H-HDD 18. This information processing apparatus uses, as a cache for an HDD 18B, a solid state device (SSD) (second nonvolatile storage module) 18C higher in access speed than the HDD 18B (first nonvolatile storage module) within the H-HDD 18 for faster access to the HDD 18B. The SSD 18C comprises a flash memory.

The CPU 11 also executes a BIOS stored in the BIOS-ROM 17. The BIOS is a program for hardware control. The BIOS which is stored in the BIOS-ROM 17 may also be hereinafter referred to as the BIOS 17.

The MCH 12 acts as a bridge that connects the CPU 11 to the ICH 14, and also acts as a memory controller for access control of the main memory 13. The MCH 12 functions to communicate with the GPU 15.

The GPU 15 is a display controller for controlling a display device which is incorporated in this information processing apparatus or which is externally connected. The CPU 15 has the VRAM 15A, and is equipped with an accelerator for drawing an image to be displayed by the various programs on behalf of the CPU 11.

the ICH 14 includes therein an AT attachment (ATA) controller for controlling the H—HDD 18 and the ODD 20. The ICH 14 controls the various peripheral devices 21 connected to a peripheral component interconnect (PCI) bus. The ICH 14 also functions to communicate with the sound controller 16.

The H-HDD 18 has a control module 18A, the HDD 18B, and the SSD 18C. The control module accesses the HDD 18B and the SSD 18C in accordance with an instruction from the ATA controller.

The sound controller 16 is a sound device, and outputs audio data to be reproduced by the various programs to, for example, a speaker which is incorporated in this information processing apparatus or which is externally connected.

The EEPROM 22 is a memory device for storing, for example, individual information for this information processing apparatus and environmental setting information. The EC/KBC 23 is a one-chip micro processing unit (MPU) which is an integration of an embedded controller for power control and a keyboard controller for controlling data input performed by operating a keyboard and a pointing device.

Figure 2:
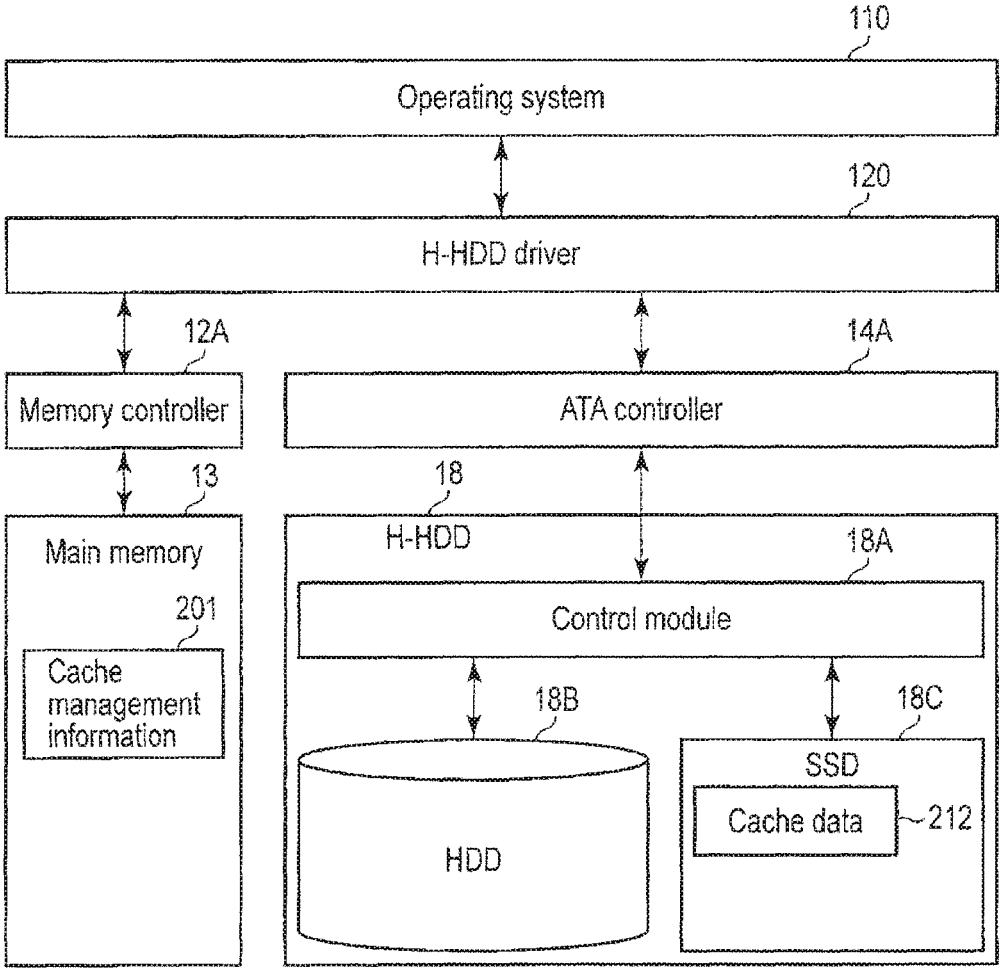
FIG. 2 is an exemplary block diagram showing primary parts of the information processing apparatus according to the first embodiment.

Now, the functions of the H-HDD 18 and the H-HDD driver 120 are described with reference to FIG. 2. FIG. 2 is a block diagram showing primary parts of the information processing apparatus shown in FIG. 1.

An information processing apparatus 10 is controlled by the operating system (OS), and the H-HDD 18 is accessed from the operating system 110 entirely via the H-HDD driver 120. The H-HDD driver 120 directly or indirectly controls an ATA controller 14A. The H-HDD 18 is connected to the H-HDD driver 120 via the ATA controller 14A. The H-HDD driver 120 accesses the main memory 13 via a memory controller 12A for data.

The H-HDD driver 120 is loaded into the main memory 13 at startup of a system. The H-HDD driver 120 secures an area for storing cache management information 201 in the main memory 13, and initializes this area so that nothing is recorded in cache data 212, and then starts cache control processing. The cache management information 201 has data for managing cache data such as a cache directory. In operation, the H-HDD driver 120 records, in the cache management information 201 within the main memory 13, data for managing learned data in a write cache and a read cache. At shutdown, the H-HDD driver 120 destroys the cache management information 201 in the main memory 13.

Before the H-HDD driver 120 starts operation, the BIOS program controls the H-HDD 18. In response to a write access request or a read access request from a host, the control module 18A. accesses the hard disk drive 188.

The H-HDD 18 is recognized as a single storage device (HDD 18B) by the operating system 110. The area in the SSD 18C is partly or entirely used as a cache for the HDD 18B. The operating system 110 cannot directly access the cache data area 212 of the SSD 18C used as an area for storing cache data.

According to the present embodiment, the driver 120 executed by the CPU 11 is used for cache control, such that the decrease of access speed can be inhibited even if the control module 18A having a low computing speed is used in the H-HDD 18.

Second Embodiment

Inhibition of Shortening of SSD Life

In the first embodiment, the cache management information 201 is destroyed at every startup. Therefore, cache data is written in the cache data area 212 at every startup, so that the life of the SSD is shortened. If it can be ensured that the cache data area 212 corresponds to data in the H-HDD 18 at startup, the cache data area 212 can be used without being destroyed by saving the cache management information 201 in a nonvolatile storage region and loading the cache management information 201 at startup, and the performance of the H-HDD 18 can be improved. in this embodiment, how the shortening of the life of the SSD is inhibited and the performance of the H-HDD can be improved is described.

Figure 3:
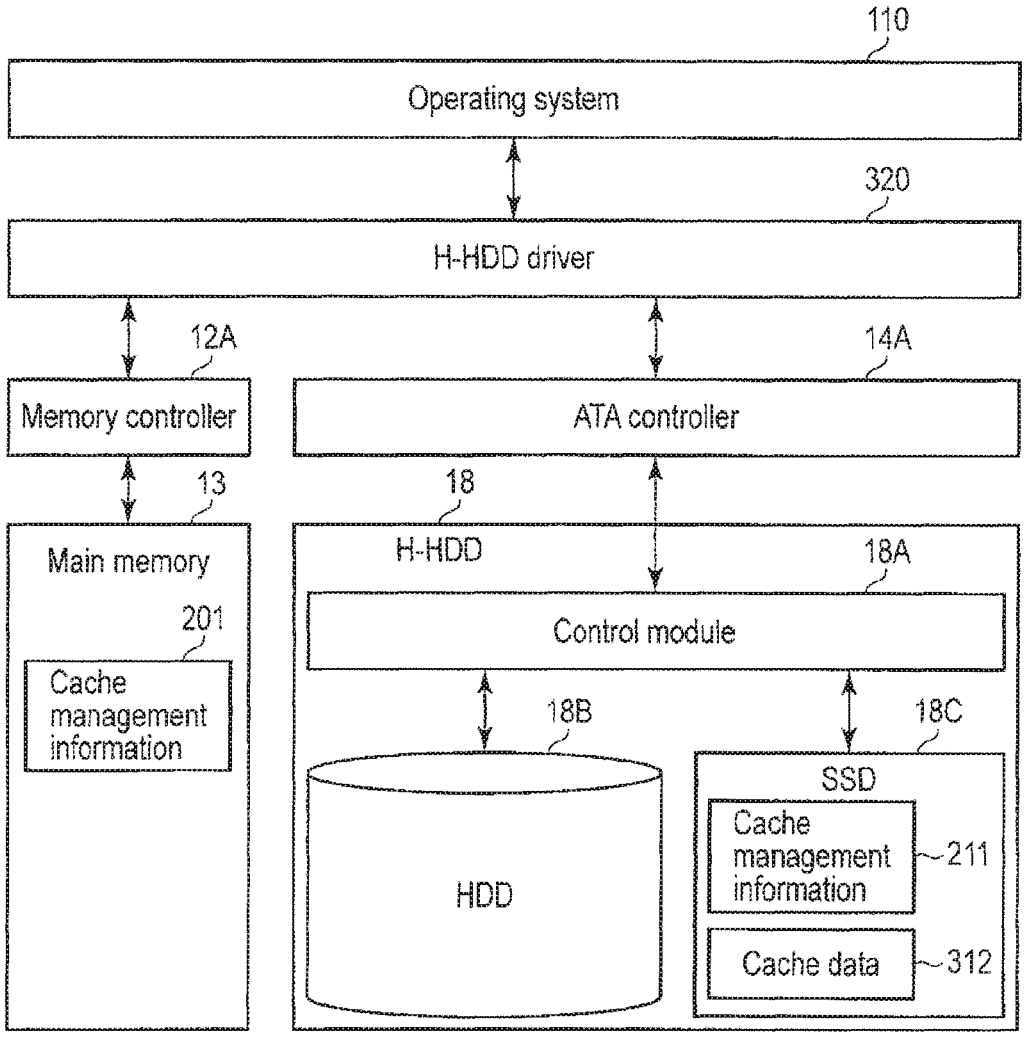
FIG. 3 is an exemplary block diagram showing primary parts of an information processing apparatus according to a second embodiment.

The functions of an H-HDD 18 and an H-HDD driver according to the present embodiment are described with reference to the block diagram shown in 3. FIG. 3 is a block diagram showing primary parts of an information processing apparatus according to the second embodiment.

An H-HDD driver 320 is loaded into a main memory 13 at startup of a system, and cache management information 211 stored in an SSD 18C is stored in the main memory 13 as cache management information 201, and then operation is started. The cache management information 211 has data for managing cache data such as a cache directory. In operation, the H-HDD driver 320 records, in the cache management information 201 within the main memory 13, learned data in a write cache and a read cache. At shutdown, the H-HDD driver 320 stores, in the H-HDD 18, the cache management information 201 within the main memory 13 as the cache management information 211.

Before the H-HDD driver 320 starts operation, a BIOS program controls the H-HDD 18. When accessed from a host, a control module 18A refers to the cache management information 211 to judge whether data is learned. At the start of operation of the H-HDD driver 320, a driver operation start notification is issued to the H-HDD 18.

The H-HDD 18 is recognized as a single storage device (HDD 18B) by an operating system 110. The area in the SSD 18C is partly or entirely used as a cache for the HDD 18B. The operating system 110 cannot directly access a cache data area 312 of the SSD 18C used as an area for storing cache data.

The control module 18A in the H-HDD 18 does not have a learning function to store cache data in the SSD 18C, but has a function of managing the cache data stored in the SSD 18C, that is, a judgment function of judging whether an access request from the host hits the cache data, a function of reading data from the cache data when the access request hits the cache data, a function of invalidating particular data in the cache data, and a function of updating management data in the cache.

After power application, the control module 18A of the H-HDD 18 manages the cache data in the SSD 18C before the driver operation start notification is issued. In a period in which the control module 18A manages the cache data, the BIOS which is not involved with the cache is in operation on the side of the host. If a read access request from the host hits the cache data in the SSD 18C, the control module 18A reads data from the SSD 18C. If the read access request misses the cache data, the control module 18A reads data from the HDD 18B. If a write request hits the cache data, the control module 18A invalidates the data in the cache data, and writes the data in the HDD 18B regardless of whether the write request hits or misses the cache. In response to the driver operation start notification from the host, the cache management is given up.

After the start of operation of the driver, the H-HDD driver 320 controls anti manages the cache data in the SSD 18C. The H-HDD driver 320 stores data in the cache, replaces data, and updates the management data when necessary.

Figure 4:
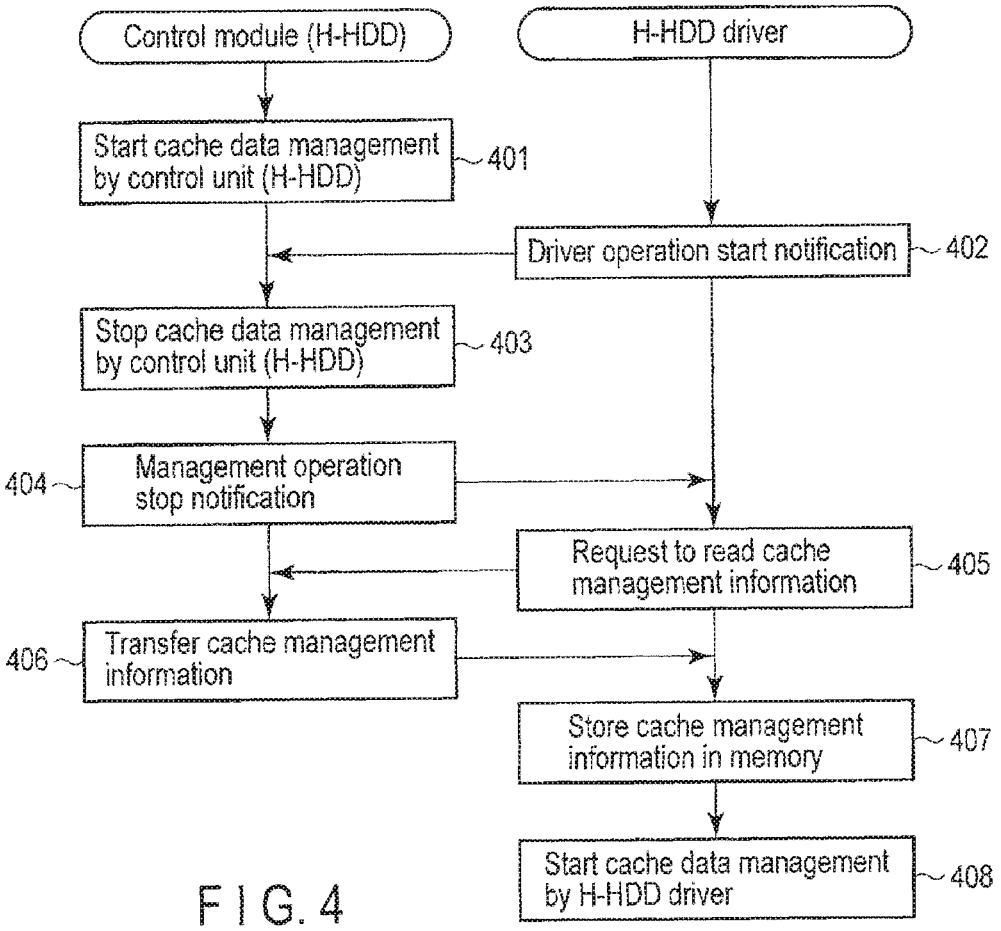
FIG. 4 is an exemplary flowchart showing the procedure of processing in a control module and an H-HDD driver after power application, according to the second embodiment.

The operations of the control module 18A and the H-HDD driver 320 after power application are described with reference to the flowchart in FIG. 4.

When power is applied, the control module 18A starts the management of the cache data in the SSD 18C (block 401). When the H-HDD driver 320 is loaded into the main memory 13 and the H-HDD driver 320 is ready for processing, the H-HDD driver 320 issues a driver operation start notification to the control module 18A (block 402). On receipt of the driver operation start notification, the control module 18A stops the management of the cache data (block 403). The control module 18A issues a management operation stop notification to the H-HDD driver 320 (block 404). On receipt of the management operation stop notification, the H-HDD driver 320 issues a request for read access to the cache management information 211 to the control module 18A (block 405). In response to the request, the control module 18A transfers the cache management information 211 to the H-HDD driver 320 (block 406). The H-HDD driver 320 stores the transferred cache management information 211 in the main memory 13 as the cache management information 201 (block 407). After storing the cache management information 201, the H-HDD driver 320 starts the management of the cache data in the hard disk drive 18B (block 408).

Figure 5:
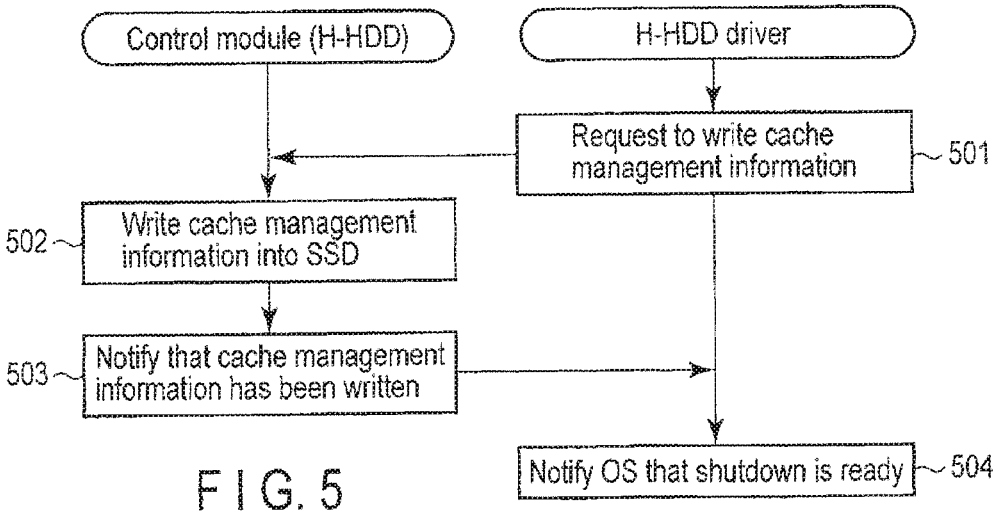
FIG. 5 is an exemplary flowchart showing the procedure of processing performed by the H-HDD driver and the control module at shutdown, according to the second embodiment.

Now, the processing performed by the H-HDD driver 320 and the control module 18A at shutdown is described with reference to the flowchart in FIG. 5.

When a shutdown notification is received from the operating system 110, the H-HDD driver 320 requests the control module 18A to gain write access to the SSD 18C of the cache management information 201 (block 501). The control module 18A writes the cache management information 201 into the SSD 180 as the cache management information 211 (block 502). After the end of writing, the control module 18A notifies the H-HDD driver 320 of the end of writing of the cache management information 211 (block 503). The H-HDD driver 320 notifies the operating system 110 that the shutdown is ready (block 504).

Figure 6:
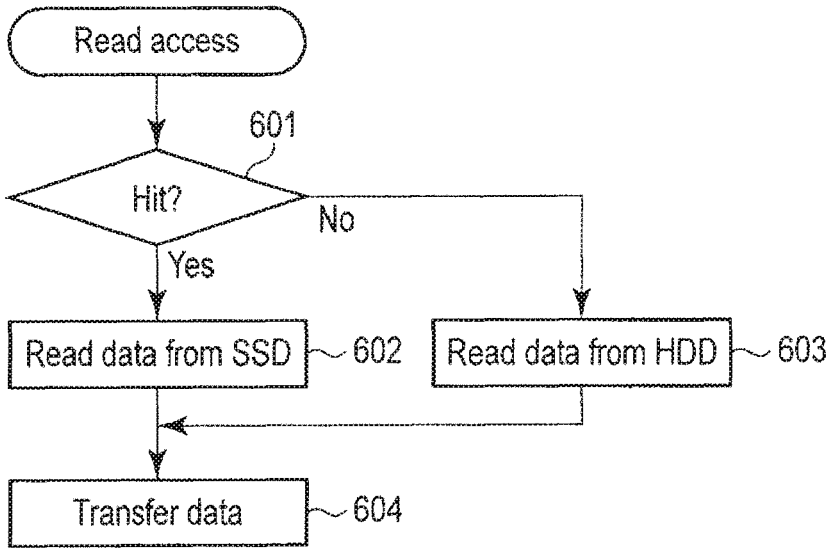
FIG. 6 is an exemplary flowchart showing the procedure of processing in the control module in the case of read access when cache data is managed by the control module of an H-HDD, according to the second embodiment.

Now, the operation of the control module 18A in the case of read access when the cache data is managed by the control module 18A of the H-HDD 18 is described with reference to the flowchart in FIG. 6.

In response to read access from the host, the control module 18A judges whether the accessed data is learned in the cache data (block 601). When it is judged that the accessed data is learned (hit) (Yes in block 601), the control module 18A reads the learned data from the SSD 18C (block 602), and transfers the read data to the host (block 604). When it is judged that the accessed data is not learned (miss) (No in block 601), the control module 18A reads the read-accessed data from the HDD 18B (block 603), and transfers the read data to the host (block 604).

Figure 7:
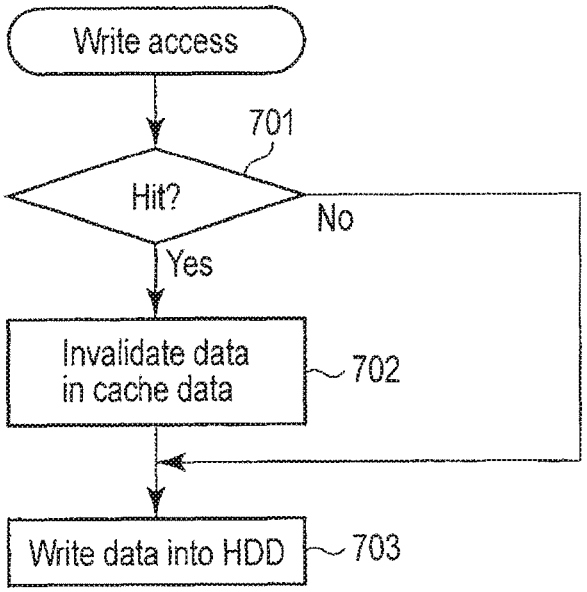
FIG. 7 is an exemplary flowchart showing the procedure of processing in the control module in the case of write access when the cache data is managed by the control module of the H-HDD, according to the second embodiment.

Now, the operation of the control module 18A in the case of write access when the cache data is managed by the control module 18A of the H-HDD 18 is described with reference to the flowchart in FIG. 7.

In response to write access from the host, the control module 18A. judges whether the accessed data is learned in the cache data (block 701). When it is judged that the accessed data is learned (hit) (Yes in block 701), the control module 18A invalidates the accessed data from the cache data in the SSD 18C (block 702), and writes the data into the HDD 18B (block 703). When it is judged that the accessed data is not learned (miss) (No in block 701), the control module 18A writes the data into the HDD 18B (block 703).

The cache control in the H-HDD 18 is limited to the period (BIOS control period) up to the start of operation of the H-HDD driver 320 after power application, and the functions are also limited (no learning function), so that the load of the cache control on the H-HDD 18 is reduced. After the start of operation of the OS, the H-HDD driver 320 entirely controls the cache. Thus, a CPU 11 having high processing power and an intermediate buffer memory that is secured in the main memory 13 make it possible to enhance performance and inhibit a cost rise.

Third Embodiment

Adaptation to Reboot without Power-Off

In the case of reboot without power-off, a control module 18A of an H-HDD 18 cannot recognize that the host has rebooted. Therefore, even if the host is rebooted, the control module 18A of the H-HDD 18 cannot manage the cache data. In the present embodiment, how the control module 18A of the H-HDD 18 recognizes reboot without normal power-off and how the control module 18A can manage the cache data after the reboot are described.

Figure 8:
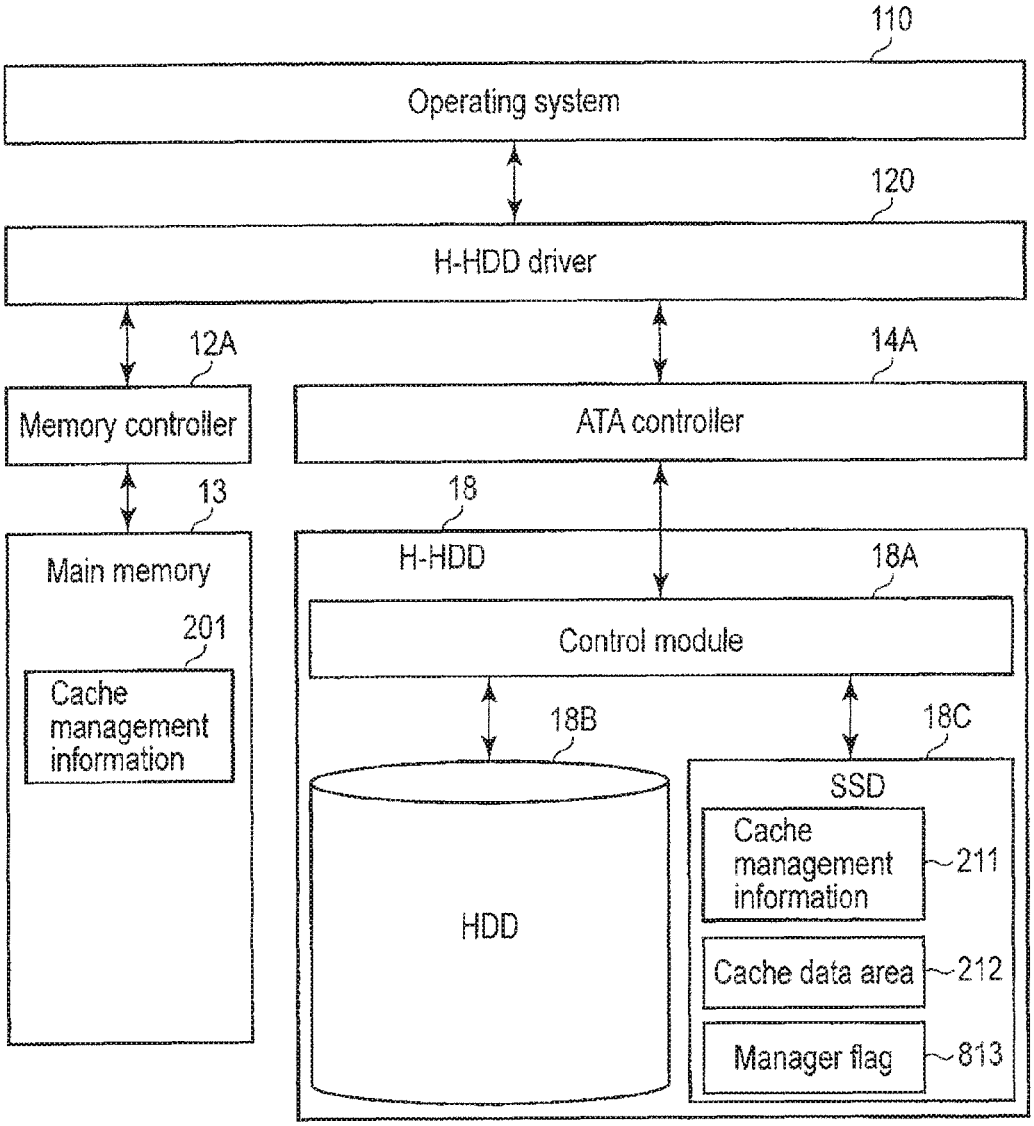
FIG. 8 is an exemplary block diagram showing the configuration of primary parts of an information processing apparatus according to a third embodiment.

FIG. 8 is a block diagram showing the configuration of primary parts of an information processing apparatus according, to the third embodiment.

An H-HDD driver 120 secures an area for writing, in a binary form, a manager flag 813 that indicates a cache manager, in the nonvolatile memory of the H-HDD 18, for example, in an SSD 18C. Written into the manager flag 813 are a value corresponding to "HHDD" indicating that the manager is the control module 18A, and a value corresponding to "DRVR" indicating that the manager is the H-HDD driver 120, The H-HDD driver 120 and the control module 18A can refer to and change the value of the manager flag 813. The initial value of the manager flag 813 is "DRVR".

The control module 18A of the H-HDD 18 refers to the value of the manager flag 813 at the time of power application and at the time of resetting. When the value is "HHDD", the control module 18A manages the cache data described in the first embodiment before a driver operation start notification is received. When the value is "DRVR", the control module 18A does not manage the cache. The reset notification is issued to the H-HDD 18 from the host at least at the time of reboot (the reset notification may also be issued while the host is in operation).

The control module 18A does not manage the cache when the value of the flag is "DRVR". The reason for this is that there can be an inconsistency between the cache data in a cache data area 212 within the SSD 18C and the cache management information 211 having a cache directory at the time of reboot that does not go through normal shutdown of the operating system 110, for example, forced reboot or reboot after the crash of the operating system 110 except for resetting during normal operation.

When the control module 18A of the H-HDD 18 receives the driver operation start notification, the cache management is given up after the value of the manager flag 813 is rewritten to "DRVR". The H-HDD driver 120 also refers to the value of the manager flag 813 at the start of operation. When the value is "HHDD", the H-HDD driver 120 validates the data in the cache data area 212, and then reads the cache management information 211 in the SSD 18C into the area of the cache management information 201 of a main memory 13. When the value is "DRVR", the H-HDD driver 120 initializes the cache management information 201 of the main memory 13 so that nothing is recorded in the cache data area 212. Here, the H-HDD driver 120 invalidates the data in the cache data area 212 when the value of the manager flag 813 is "DRVR". This means the occurrence of reboot that does not go through normal shutdown of the operating system 110, for example, forced reboot or reboot after the crash of the operating system 110, which is attributed to the fact that there is an inconsistency between the data in the cache data area 212 and the cache management information 211 including the cache directory.

The H-HDD driver 120 changes the value of the manager flag 813 to "HHDD" at normal shutdown processing.

Figure 9:
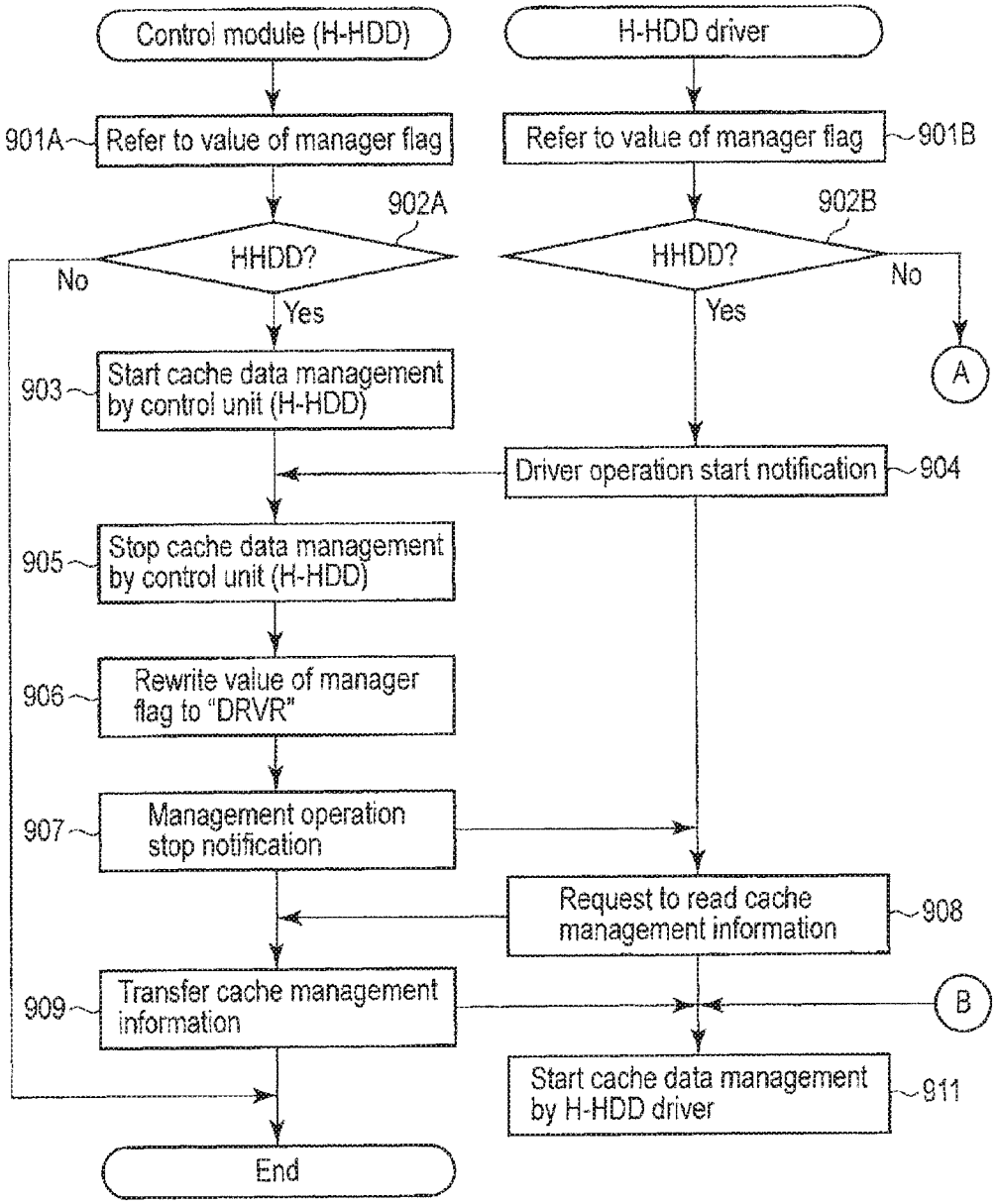
FIG. 9 is an exemplary flowchart showing the procedure of processing in an H-HDD driver and a control module at startup, according to the third embodiment.
Figure 10:
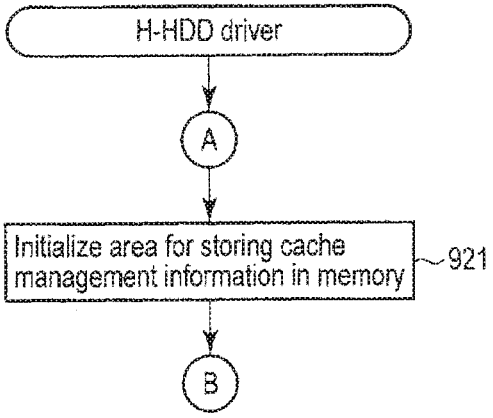
FIG. 10 is an exemplary flowchart showing the procedure of processing in the H-HDD driver and the control module at startup, according to the third embodiment.

The procedure of processing in the H-HDD driver 120 and the control module 18A at startup is described with reference to the flowcharts in FIG. 9 and FIG. 10.

After startup, the control module 18A refers to the value of the manager flag 813 (block 901A). The control module 18A judges whether the value of the manager flag 813 is "HHDD" (block 902A). When it is judged that the value is "HHDD" (Yes in block 902A), the control module 18A starts the management of the cache data in the SSD 18C (block 903).

When the H-HDD driver 120 is loaded into the main memory 13 and the H-HDD driver 120 is ready to perform processing, the H-HDD driver 120 refers to the value of the manager flag 813 (block 901B). When it is judged that the value is "HHDD" (Yes in block 902B), the H-HDD driver 120 issues a driver operation start notification to the control module 18A (block 904).

On receipt of the driver operation start notification, the control module 18A stops the management of the cache data (block 905). The control module 18A rewrites the value of the manager flag 813 to "DRVR" (block 906). The control module 18A issues a management operation stop notification to the H-HDD driver 120 (block 907). On receipt of the management operation stop notification, the H-HDD driver 120 issues, to the control module 18A, a request for read access to the cache management information 211 (block 908). In response to the request, the control module 18A transfers the cache management information 211 to the area in the cache management information 201 of the main memory 13 (block 909). After reading the cache management information 201, the H-HDD driver 120 starts the management of the cache data in the hard disk drive 18B (block 911).

When it is judged in blocks 902A and 902B that the value is not "HHDD" (No in blocks 902A and 902B), the H-HDD driver 120 initializes the cache management information 201 in the main memory 13 (block 924).

Figure 11:
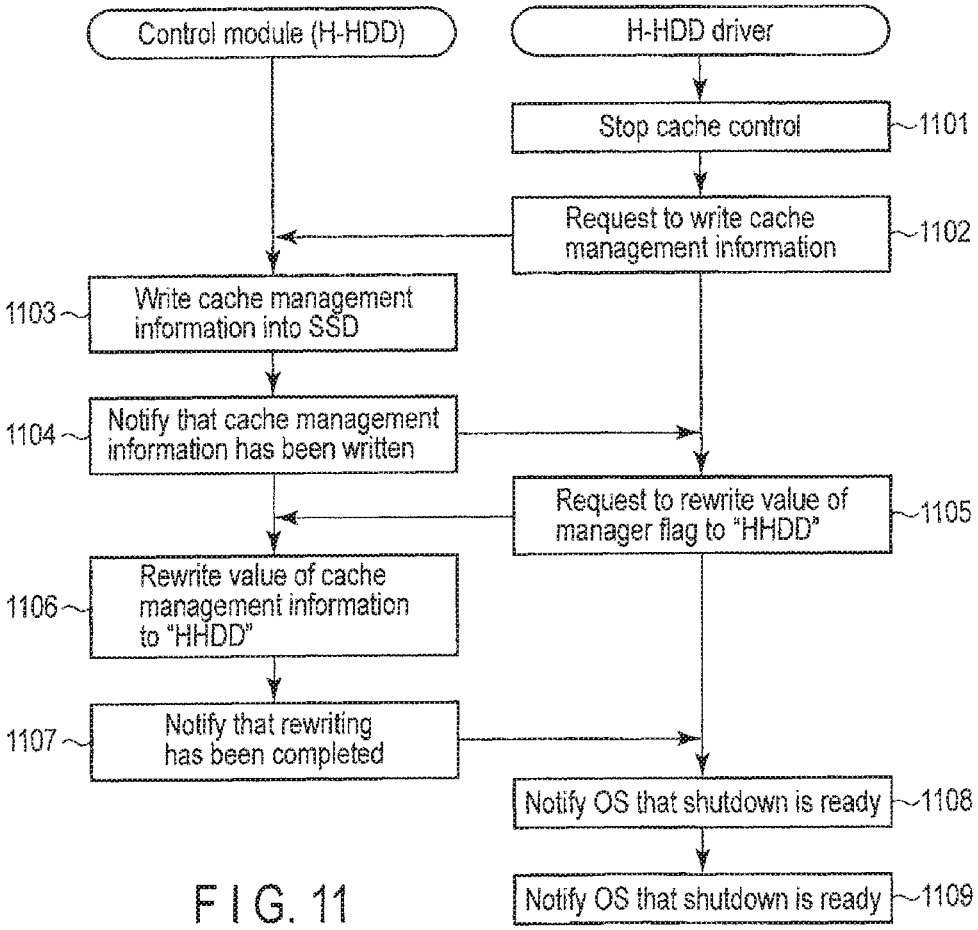
FIG. 11 is an exemplary flowchart showing the procedure of processing in the H-HDD driver and the control module at normal shutdown, according to the third embodiment.

Now, the procedure of processing performed by the H-HDD driver 120 and the control module 18A at normal shutdown are described with reference to FIG. 11.

When a shutdown notification is received from the operating system 110, the H-HDD driver 120 stops the cache control processing (block 1101). The H-HDD driver 120 requests the control module 18A to gain write access to the SSD 18C of the cache management information 201 (block 1102). The control module 18A writes the cache management information 201 into the SSD 18C as the cache management information 211 (block 1103). After the end of writing, the control module 18A notifies the H-HDD driver 120 of the end of writing of the cache management information 211 (block 1104).

The H-HDD driver 120 commands the control module 18A to rewrite the value of the manager flag 813 to "HHDD" (block 1105). The control module 18A rewrites the value of the manager flag 813 to "HHDD" (block 1106). After rewriting, the control module 18A notifies that the rewriting has been completed (block 1107). After the reception of the notification, the H-HDD driver 120 notifies the operating system 110 that shutdown is ready (block 1109).

In the present embodiment, when the apparatus is improperly shut down, the cache management information 211 is destroyed, and the cache is managed on the basis of the initialized cache management information 201. It is therefore possible to cope with reboot without normal power-off.

Fourth Embodiment

Faster Startup

In the present embodiment, how to speed up the startup is described.

Figure 12:
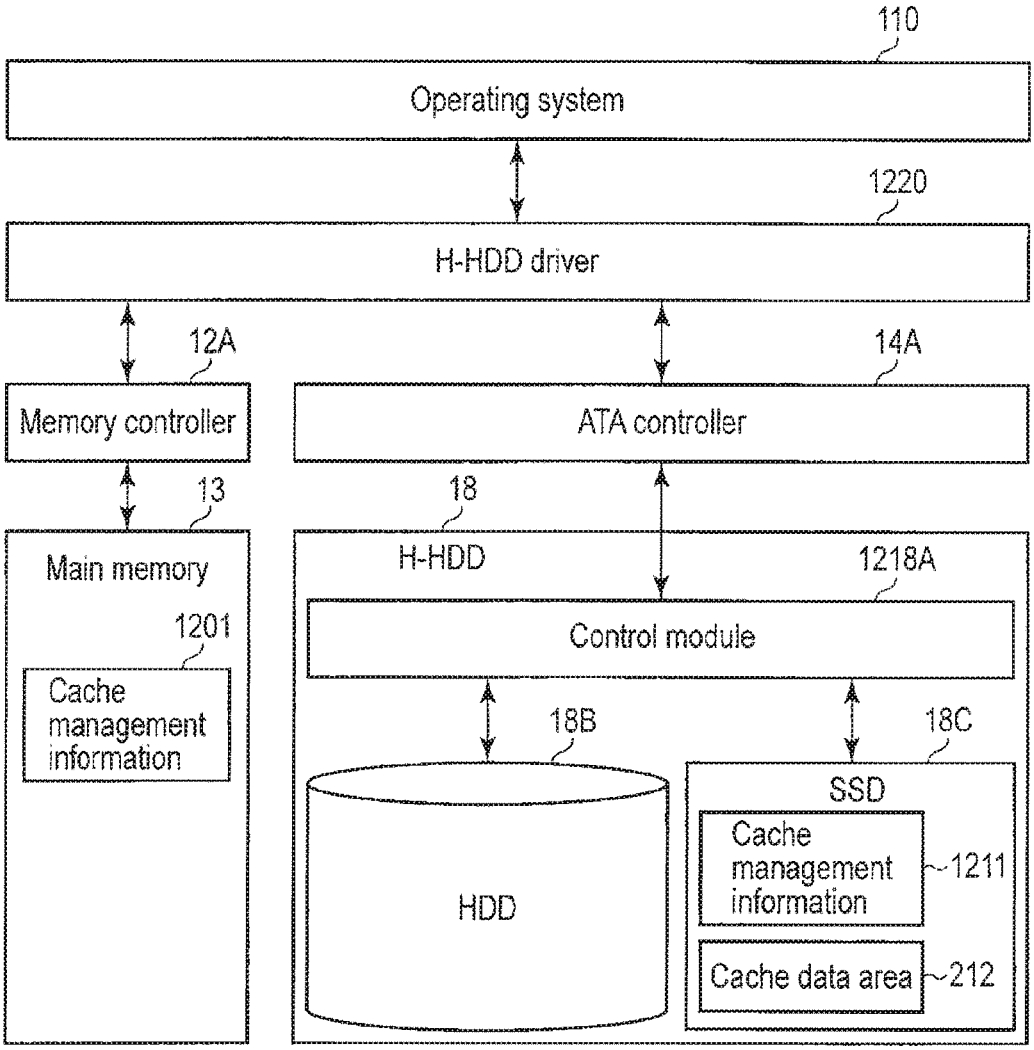
FIG. 12 is an exemplary block diagram showing primary parts of an information processing apparatus according to a fourth embodiment.

The functions of an H-HDD 18 and an H-HDD driver according to the fourth embodiment are described with reference to the block diagram shown in FIG. 12. FIG. 12 is a block diagram showing primary parts of an information processing apparatus according to the fourth embodiment.

Cache management information 1201 (1211) generated by an H-HDD driver 1220 according to we present embodiment has management data 1301 and a cache directory 1302, as shown in FIG. 13. A later-described trace area 1301A is secured in the management data 1301.

The H-HDD driver 1220 according to the present embodiment uses a 16-way set associative method as an example of a cache method. The cache directory 1302 in the cache management information 1201 (1211) is, for example, a table including 512 K indexes×16 ways, as shown in FIG. 14. Tag data managed by the cache directory 1302 comprises a tag 1501 and other management data 1502, as shown in FIG. 15. A quotient obtained when the LBA of an HHD 18B is divided by the number of indexes is Tag, and the remainder is Index.

The H-HDD driver 1220 provides a startup flag 1501A in the management data 1502 in each tag data 1500 managed by the cache directory. The value of the startup flag is "0" or "1". The value "1" of the startup flag 1501A indicates the tag data 1500 corresponding to the cache data that has been used at startup. The value "0" of the startup flag 1501A indicates the tag data 1500 that has not been used at startup.

The H-HDD driver 1220 also secures a trace area 1301A in the management data 1301 within the cache management information 1201 (1211). A control module 18A of the H-HDD 18 and the H-HDD driver 1220 can refer to and change the trace area 1301A. Moreover, a startup completion notification is issued to the H-HDD driver 1220 from an unshown program which operates when the start of an operating system 110 is completed.

When the control module 18A of the H-HDD 18 manages cache data, the control module 18A rewrites the value of the startup flag 1501A of the tag data corresponding to the hit cache data in the cache directory to "1" if the cache data hits a read access request. When the cache data misses the read access request, the control module 18A stores parameters (LBA, the number of sectors) of the read access request in the trace area 1301A in the cache management information 1211.

After the start of operation, the H-HDD driver 1220 refers to the trace area 1301A in the cache management information 1211, and stores, in the SSD 18C as cache data, the data read by the BIOS before the start of operation of the H—HDD driver 1220, and then sets, to "1", the vain of the startup flag of the tag data corresponding to the cached data in the cache directory.

The H-HDD driver 1220 controls the cache corresponding to the tag data having the startup flag "1" in the cache directory so that the cache does run out of the cache data area 212.

When the cache management information 1201 including the cache directory in the main memory 13 is saved in the SSD 18C as the cache management information 1211 at shutdown, the H-HDD driver 1220 sets the values of all the startup flags in the cache directory to "0".

Figure 16:
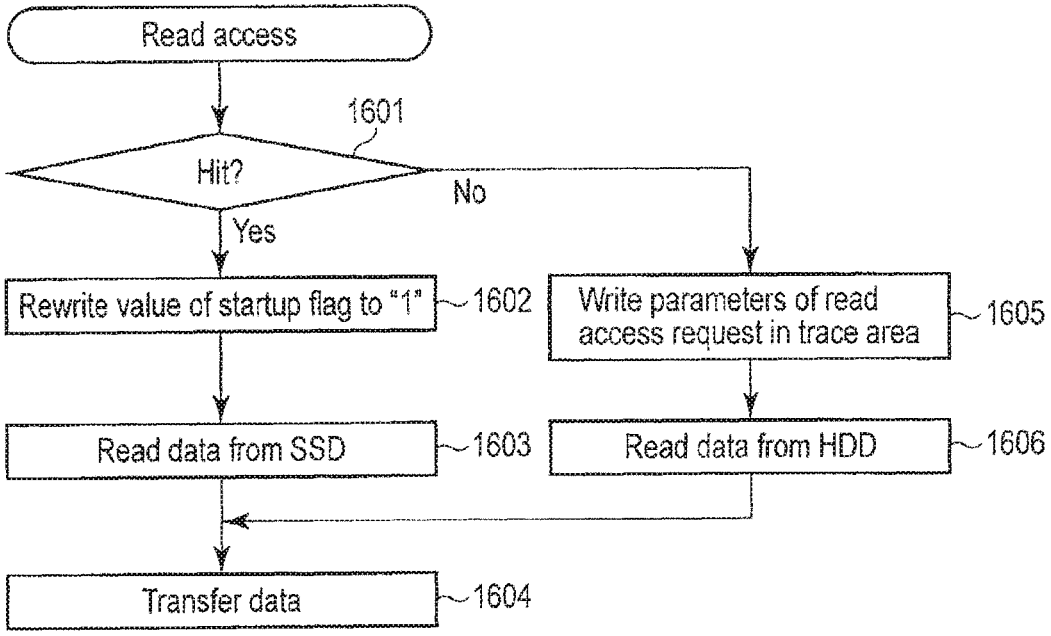
FIG. 16 is an exemplary flowchart showing the procedure of processing in a control module in the case of read access when cache data is managed by a control module of an H-HDD, according to the second embodiment.

Now, the operation of a control module 1218A in the case of read access when the cache data is managed by the control module 18A of the H-HDD 18 is described with reference to the flowchart in FIG. 16.

In response to read access from a host, the control module 1218A judges whether the accessed data is learned in the cache data (block 1601). When it is judged that the accessed data is learned (hit) (Yes in block 1601), the control module 1218A rewrites the value of the startup flag 1501A of the tag data corresponding to the hit cache data in the cache directory to "1" (block 1602). The control module 1218A reads the learned data from the SSD 18C (block 1603), and transfers the read cache data to the host (block 1604).

When it is judged that the accessed data is not learned (miss) (No in block 1601), the control module 1218A writes parameters (LBA, the number of sectors) of the read access request in the trace area 1301A in the cache management information 1211 (block 1605). The control module 1218A reads the read-accessed data from the hard disk drive 188 (block 1606), and transfers the read data to the host (block 1604).

The present embodiment contributes to faster startup of the whole system. The same data is often read at startup every time, but the data (place) to be read may vary at every startup. The advantage of the present embodiment is that data used for startup is learned at every startup so that it is possible to adapt to the variation of data read at startup.

The control module 1218A of the H-HDD 18 maintains simple processing to only record a command for the read access request in the trace area 1301A when the read request misses the cache, and thereby reduces the load on the control module 1218A.

Fifth Embodiment

Restriction of Learned Data at Startup

According to the embodiments described above, the data learned at startup is not deleted. Therefore, if much data is learned at startup, the area in the cache data area 212 available during operation is reduced, and sufficient cache effects cannot be obtained. In the present embodiment, how to restrict the amount of data learned at startup is described.

Figure 17:
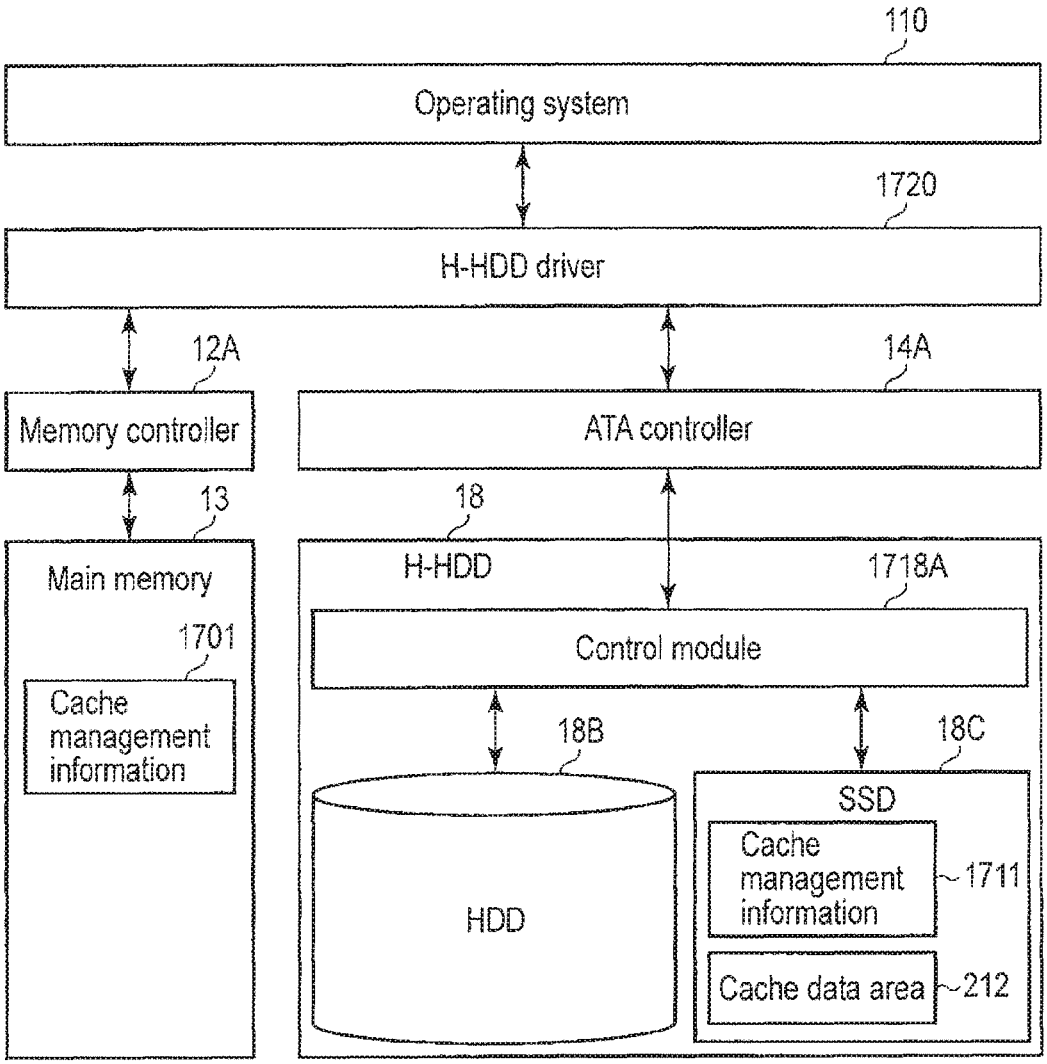
FIG. 17 is an exemplary block diagram showing primary parts of an information processing apparatus according to a fifth embodiment.

FIG. 17 is a block diagram for explaining the functions of an H-HDD 18 and an H-HDD driver according to the fifth embodiment. FIG. 17 is a block diagram showing primary parts of an information processing apparatus according to the fifth embodiment.

Figure 18:
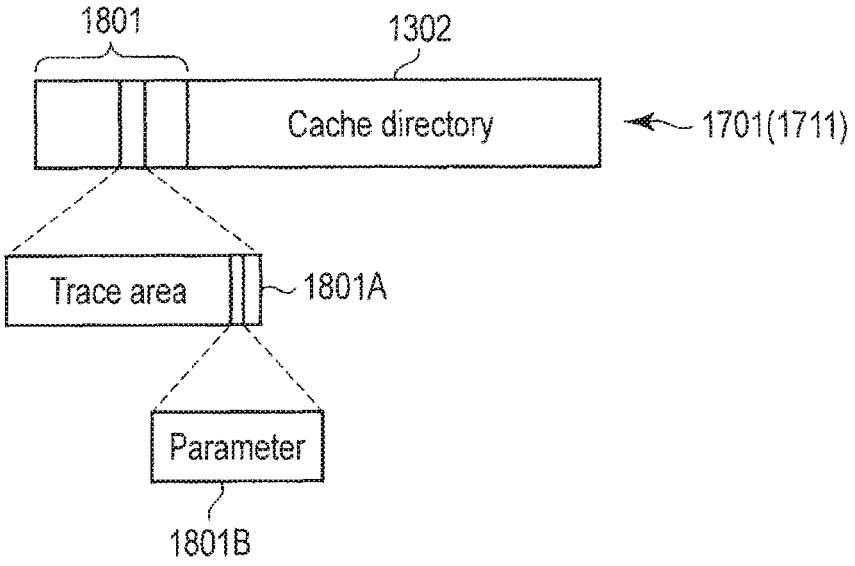
FIG. 18 is an exemplary diagram showing an example of cache management information generated by an H-HDD driver of the information processing apparatus according to the fifth embodiment.
Figure 19:
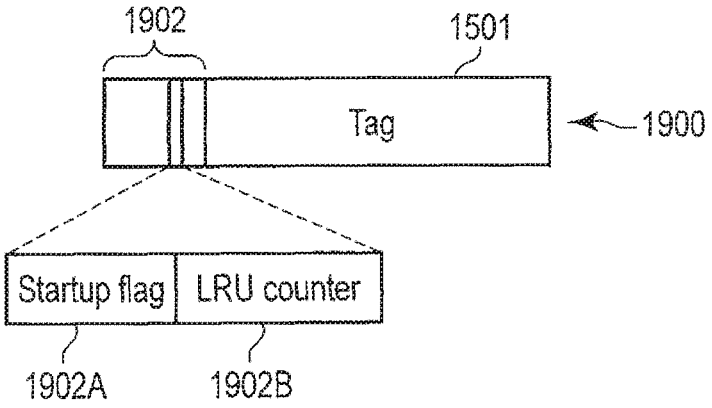
FIG. 19 is an exemplary diagram showing an example of tag data according to the fifth embodiment.

Cache management information 1701 (1711) generated by an H-HDD driver 1720 according to the present embodiment has management data 1801 and a cache directory 1302, as shown in FIG. 18. As in the fourth embodiment, a trace area 1801A is secured in the cache management information 1701 (1711). A startup flag 1902A and an LRU counter 1902B are provided in management data 1902 of each tag data 1900 managed by the cache directory 1302. The LRU counter 1902B is a field for recording the order of accesses in the same index. For example, in the case of 16 ways, when the LRU counter 1902B indicates 0, the corresponding data has been most recently accessed. When the LRU counter 1902B indicates 15, the corresponding data has been accessed earliest. When a control module 1718A manages the cache data, the control module 1718A rewrites the value of the startup flag 1902A in the cache directory 1302 to "1" and updates the LRU counter 1902B of the same index if the cache data hits a read access request. When the cache data misses the read access request, the control module 1718A records parameters (LBA, the number of sectors) 1801B of the read access request in the trace area 1801A. in the order of reading.

The H-HDD driver 1720 restricts the amount of tag data for which the value of the startup flag is "1" to a predetermined amount, for example, to an amount corresponding to 4 ways equal to one fourth of 16 ways, in the case of 16 ways. The H-HDD driver 1720 performs control in accordance with the LRU counter 1902B so that data of earlier access dates remain in the cache data area 212.

Now, how to manage the cache by the H-HDD driver 1220 is described with reference to the flowchart in FIG. 20.

The H-HDD driver 1720 calculates, index by index in the cache directory, the number of tag data for which the value of the startup flag 1902A is "1" (block 2001). The H-HDD driver 1720 judges, index by index, whether the number of tag data for which the value of the startup flag 1902A is "1" is more than a set number (block 2002). When judging that the number of tag data is more than the set number (Yes in block 2002), the H-HDD driver 1720 refers to the LRU counter 1902B and then sets, to "0", the value of the startup flag 1902A for the tag data of the latest access date among tag data for which the value of the startup flag 1902A is "1" in the same cache directory of the same index (block 2009). The H-HDD driver 1720 performs processing from block 2001.

When judging that the number of tag data is not more than the set number (No in block 2002), the H-HDD driver 1720 sequentially processes the traces in the trace area 1801A from the head. The H-HDD driver 1720 judges whether a parameter 1801B is present in the trace area 1801A (block 2003). When judging that the parameter 1801B is present (Yes in block 2003), the H-HDD driver 1720 calculates an index from the parameter in the trace area, and calculates the number of tag data for which the value of the startup flag is "1" in the corresponding index in the cache directory (block 2004). The H-HDD driver 1720 judges whether the number of tag data is equal to the set number (block 2005). When judging that the number of tag data is not equal to the set number (Yes in block 2005), the H-HDD driver 1720 destroys the parameter 1801B in the trace area 1801A (block 2010).

When judging that the number of tag data is equal to the set number (Yes in block 2005), the H—HDD driver 1720 reads, from an HDD, data corresponding to the parameter being processed (block 2806). The H-HDD driver 1720 refers to the LRU counter in the same index and then replaces the oldest cache data for which the value of the startup flag is "0" with the data read from the HDD (block 2007). The H-HDD driver 1720 sets the value of the startup flag of the tag data corresponding to the replaced data to "1", and then adds the tag data to the cache directory (block 2008). After block 2008, the H-HDD driver 1720 performs processing in and after block 2003. When judging that the parameter 1801B is not present (No in block 2003), the H-HDD driver 1720 ends the processing.

After the completion of the processing of the trace data, the H-HDD driver 1720 does not change the value of the startup flag until a startup completion notification to the driver is received. If a read request from an operating system hits the cache and the number of tag data for which the value of the startup flag is "1" in the same index is equal to the set number. If the number of tag data for which the value of the startup flag is "1" in the same index is different from (smaller than) the set number, the H-HDD driver 1720 changes the value of the startup flag to "1". When the read request from the operating system misses the cache and the data read from the HDD is registered in the cache, the H-HDD driver 1720 sets the value of the startup flag to "0" if the number of tag data for which the value of the startup flag is "1" in the same index is equal to the set number. If the number of tag data for which the value of the startup flag is "1" in the same index is different from (smaller than) the set number, the H-HDD driver 1720 sets the value of the startup flag to "1".

The present embodiment ensures that a given amount of cache data or more can be secured even in normal operation when the startup completion notification to the driver is not issued for some reason or when the amount of reading is more than expected.

Sixth Embodiment

Write Data at Boot is Deleted from the Cache Data

In the present embodiment, how to leave minimum data that is unlikely to be read at the next startup is described.

The configurations of an H-HDD driver and a control module according to the present embodiment are similar to those in the fourth embodiment, and are therefore not shown.

When there is a request for write access to cache data corresponding to tag data for which the value of a startup flag is "1", an H-HDD driver 1220 sets the value of the startup flag to "0". Cache data read-accessed at startup and then write-accessed is not likely to be read at the next startup. Even if the cache data corresponding to the tag data for which the value of the startup flag is "0" is deleted, there is no increase in boot time.

When a write access request corresponds to data that corresponds to a parameter in a trace area, a control module 1218A of an H-HDD 18 may delete this parameter at startup.

According to the present embodiment, the read-accessed cache data is deleted to sort the cache data and inhibit the increase of the boot time.

Seventh Embodiment

Another HDD is Targeted for Cache

Figure 21:
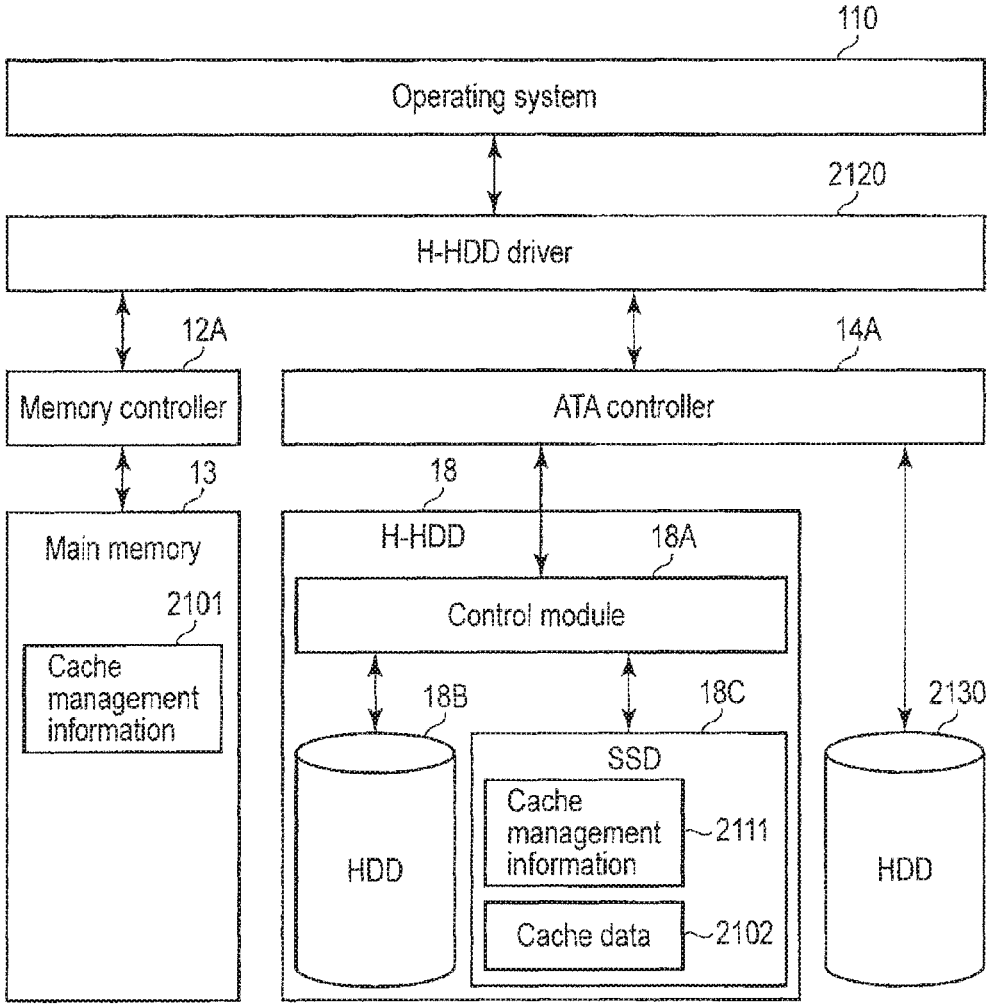
FIG. 21 is an exemplary block diagram showing an example of primary parts of an information processing apparatus according to a seventh embodiment.

FIG. 21 is a block diagram showing primary parts of an information processing apparatus according to the seventh embodiment.

An H-HDD driver according to the present embodiment uses at least part of the area in an SSD 18C as a cache for an HDD 18B and an HDD 2130.

Figure 22:
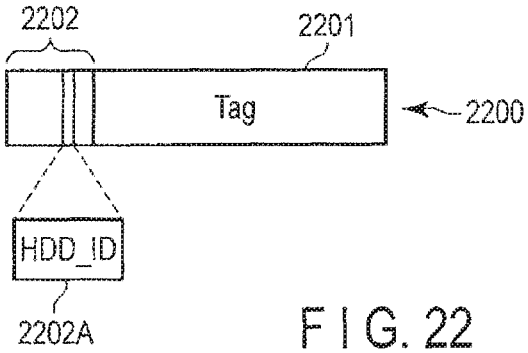
FIG. 22 is an exemplary diagram showing an example of tag data in cache management information managed by an H-HDD driver according to the seventh embodiment.

Tag data in cache management information 2011 (2111) managed by an H-HDD driver 2120 is described with reference to FIG. 22. An HDD_ID 2202A for identifying an HDD to be learned is recorded in management data 2202 within tag data 2200. The number of bits in the HDD_ID 2202A is set when cache management information 2101 is created.

According to the present embodiment, not only the HDD 18B of an H-HDD 18 but also the additional HDD 2130 connected to the information processing apparatus to which the H-HDD 18 is connected is improved in performance. For example, if a USB-HDD that uses the H-HDD according to the present application is connected to the information processing apparatus, the HDD included in the information processing apparatus is also increased in speed.

Eighth Embodiment

HDD and SSD are Shown to be Independent

According to the present embodiment, there are provided a first storage device (HDD) Such as a magnetic disc that is relatively high in capacity, less expensive, low in speed, and high in power consumption, and a second storage device (SSD) such as a semiconductor nonvolatile memory that is relatively low in capacity, expensive, high-speed, and low in power consumption. External storage device control means (HDD driver) that operates on a computer system (PC) to which an external storage device is connected uses the SSD as a cache for the HDD. Thus, a storage system which is relatively high in capacity, less expensive, high-speed, and low in power consumption is provided.

In the seventh embodiment and the preceding embodiments, the H-HDD comprising the HDD and the SSD is shown as a single storage device to the host. In the present embodiment, the HDD and the SSD are shown as independent storage devices to the host. In the present embodiment, even an OS that can only issue one command to the same device at the some time can issue commands to both the HDD and the SSD at the same time.

Figure 23:
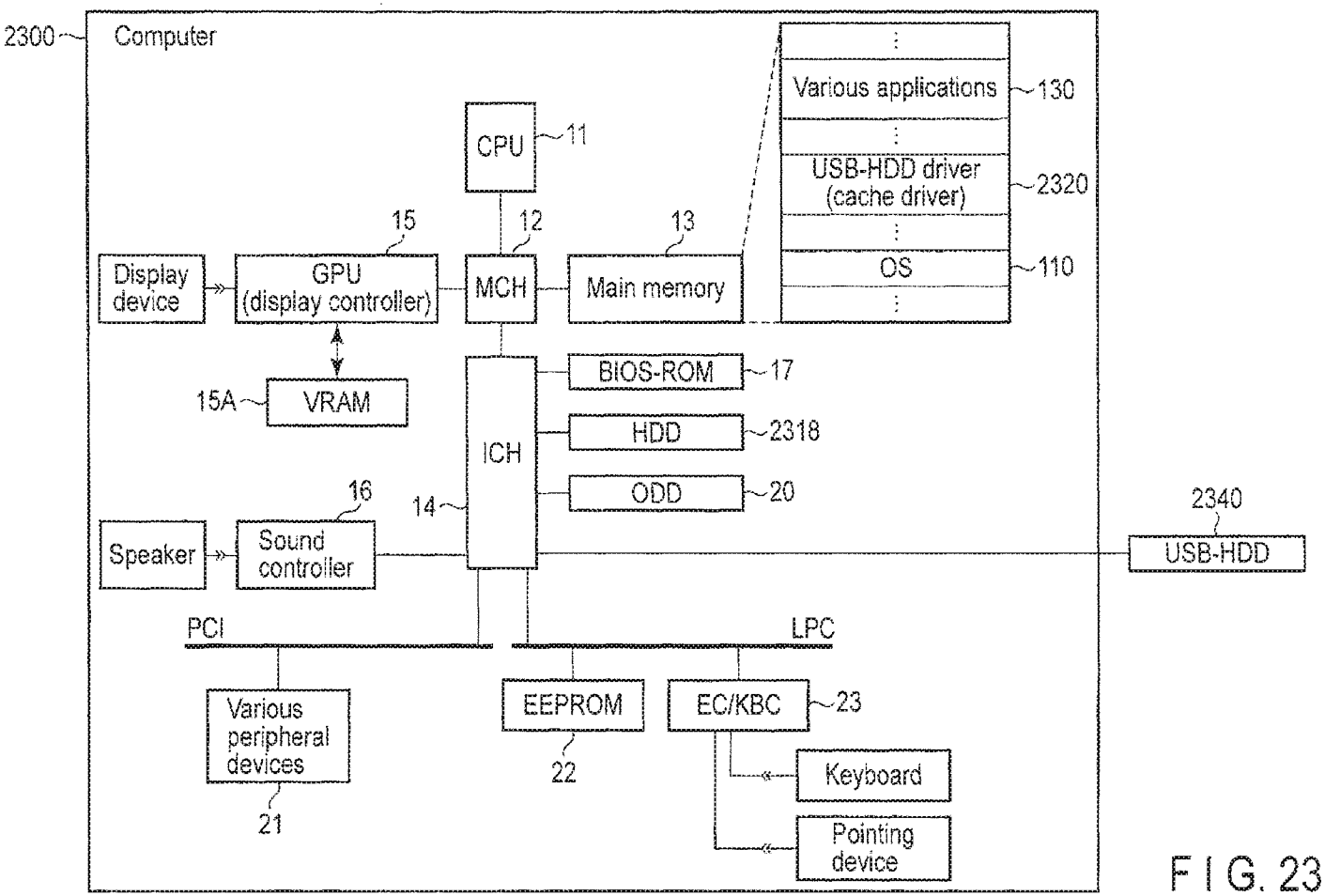
FIG. 23 is an exemplary block diagram showing an example of the configuration of an information processing apparatus according to an eighth embodiment.

FIG. 23 is a diagram showing a system configuration of an information processing apparatus according to the eighth embodiment. The information processing apparatus according to the present embodiment is provided as a personal computer.

As shown in FIG. 23, this information processing apparatus comprises a CPU 11, an MCH 12, a main memory 13, an ICH 14, a GPU 15, a VRAM 15A, a sound controller 16, a BIOS-ROM 17, an HDD 2318, an ODD 20, various peripheral devices 21, an EEPROM 22, and an EC/KBC 23.

The CPU 11 is a processor for controlling the operation of this information processing apparatus, and executes a cache driver 2320 loaded into the main memory 13. The cache driver 2320 is a program for controlling the HDD 2318 and a USB-HDD 2340 which is an external storage device. The ICH 14 includes therein a USB controller for controlling a USB device such as the USB-HDD 2340.

Figure 24:
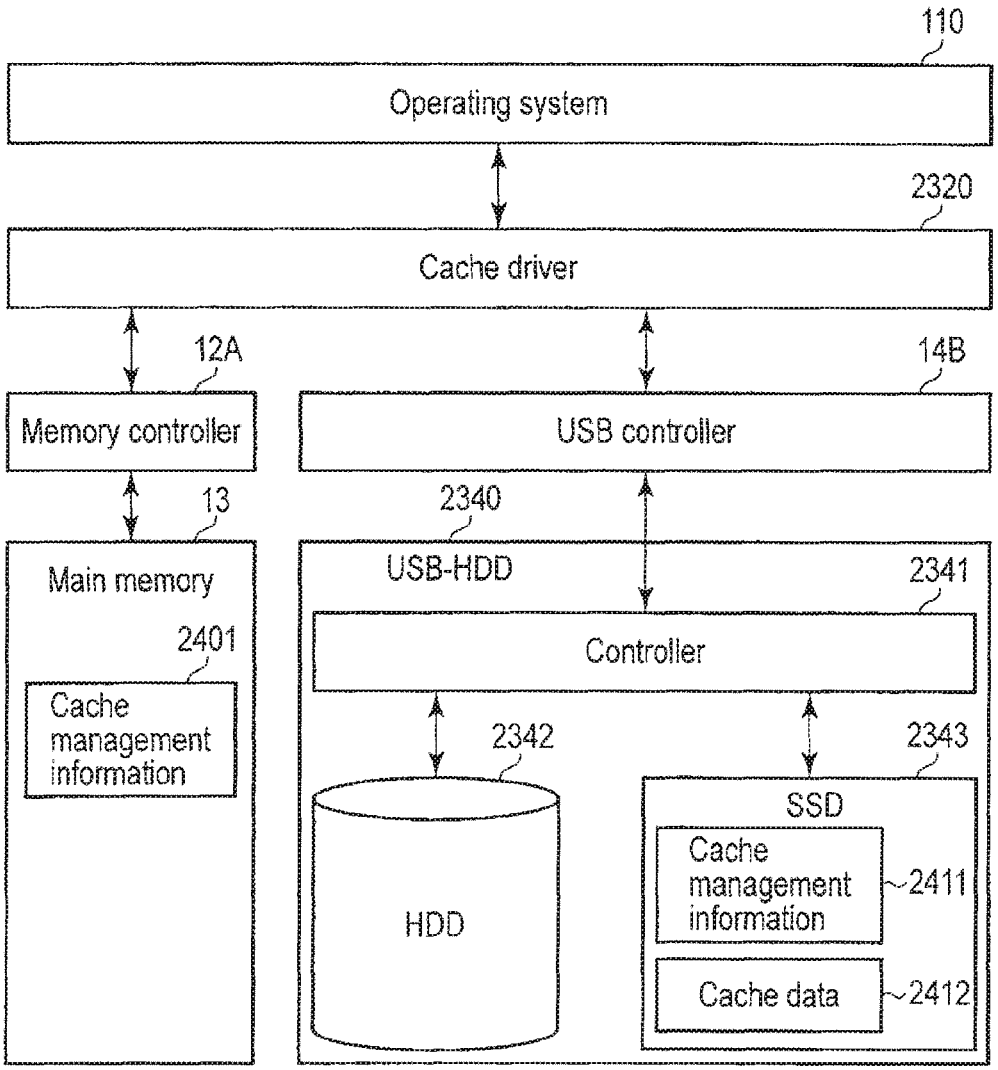
FIG. 24 is an exemplary block diagram showing an example of primary parts of the information processing apparatus according to the eighth embodiment.

Now, the configurations of the USB-HDD 2340 and the information processing apparatus for controlling the USB-HDD 2340 are described with reference to FIG. 24. FIG. 24 is a block diagram showing primary parts of the information processing apparatus according to the eighth embodiment.

As shown in FIG. 24, the USB-HDD 2340 comprises a controller 2341, an HDD 2342, and an SSD 2343.

The HDD 2342 and the SSD 2343 are storages conforming to an ATA standard. The controller 2341 is a bridge device that converts a USB-standard command and an ATA-standard command. The USB/ATA bridge controller 2341 converts a USB-standard command issued from a USB controller 14B to an ATA-standard command, and issues the converted command to the HDD 2342 or the SSD 2343. The controller 2341 converts an ATA-standard command issued from the HDD 2342 or the SSD 2343 to a USB-standard command, and issues the converted command to the USB controller 14B.

At least part of the area in the SSD 2343 is used as a cache device for the HDD 2342. The cache driver 2320 secures, in the main memory 13, an area for storing cache management information 2401, and then starts cache control processing. The cache management information 2401 has data for managing cache data such as a cache directory. The cache driver 2320 records, in the cache management information 2401 within the main memory 13, data for managing learned data in a write cache and a read cache. At shutdown, the cache driver 2320 records, in the SSD 2343, the cache management information 2401 within the main memory 13 as the cache management information 2411. At startup, the cache management information 2411 is loaded into the main memory 13 by the cache driver as the cache management information 2401.

The USB-HDD 2340 may be connected not only to a computer 2300 in which the driver 2320 is installed but also to a computer in which no driver is installed for data exchange. When the entire area in the SSD 2343 is used as the cache for the HDD 2342, the computer in which no cache driver is installed does not need to show the SSD 2343 to the OS of the computer in which no driver is installed. If the SSD 2343 is shown to the OS of the computer in which no driver is installed, internal resources are consumed by the operation of a mechanism or operating the SSD 2343, or the sight of the device that cannot be used unnecessary confuses the user. In the present embodiment, the SSD is shown to the OS only when necessary.

When loaded into the main memory 13 and operable, the cache driver 2320 issues a "cache driver operation start notification" to the USB-HDD 2340. The controller 2341 shows the HDD 2342 alone to an OS 110 after power application. On receipt of the "cache driver operation start notification" issued from the cache driver 2320, the controller 2341 shows the SSD 2343 to the OS 110.

Figure 25:
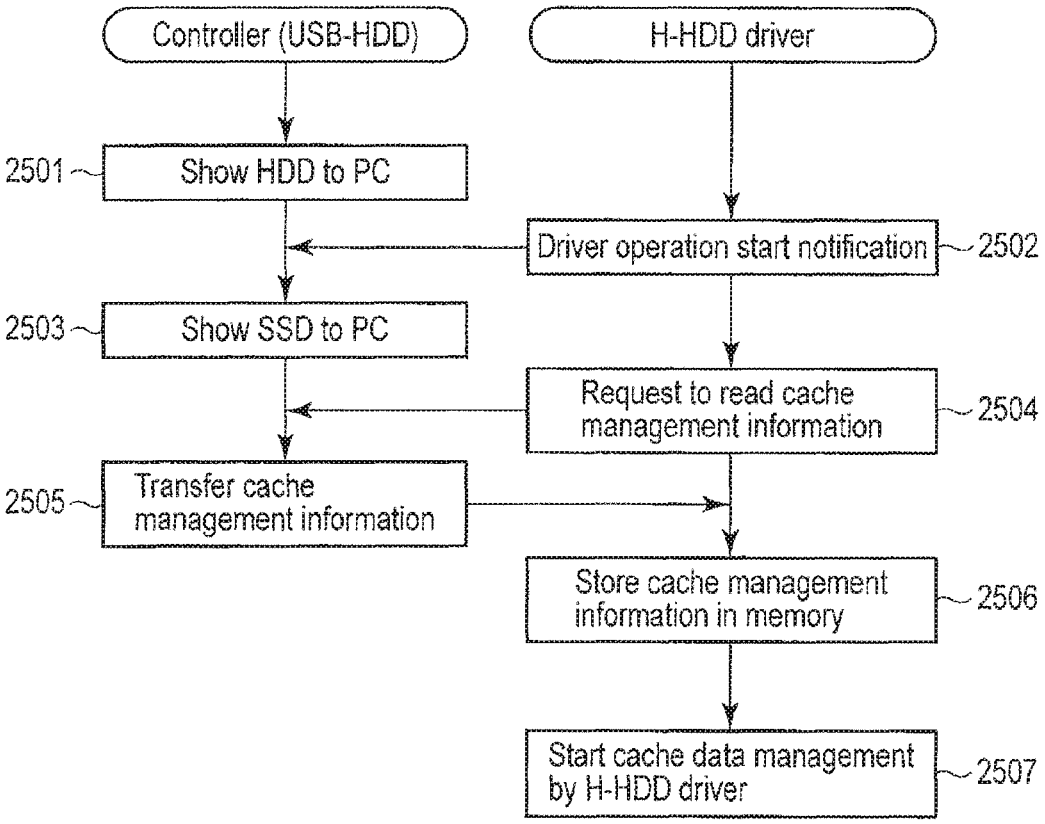
FIG. 25 is an exemplary flowchart showing an example of the procedure of processing in a controller and a USB-HDD driver after power application, according to the eighth embodiment.

The operations of the controller 2341 and the cache driver 2320 after power application are described with reference to the flowchart in FIG. 25.

When power is applied, the controller 2341 shows the HDD 2342 to the computer (PC) 2300 (block 2501). When the cache driver 2320 is loaded into the main memory 13 and is ready to perform processing, the cache driver 2320 issues a driver operation start notification to the controller 2341 (block 2502). On receipt of the driver operation start notification, the controller 2341 shows the SSD 2343 to the computer 2300 (block 2503). The cache driver 2320 issues a read access request for the cache management information 2411 to the controller 2341 (block 405). The controller 2341 transfers the cache management information 2411 to the cache driver 2320 in response to the request (block 406). The cache driver 2320 stores the transferred cache management information 2411 in the main memory 13 as the cache management information 2401 (block 407). After storing the cache management information 2401, the cache driver 2320 starts the management of the cache data in the hard disk drive 2342 (block 408).

According to the present embodiment, the HDD 2342 and the SSD 2343 are shown to the computer 2300. Thus, even an OS that can only issue one command to the same device at the same time can issue commands to both the HDD and the SSD at the same time.

Ninth Embodiment

Write Trace

Figure 26:
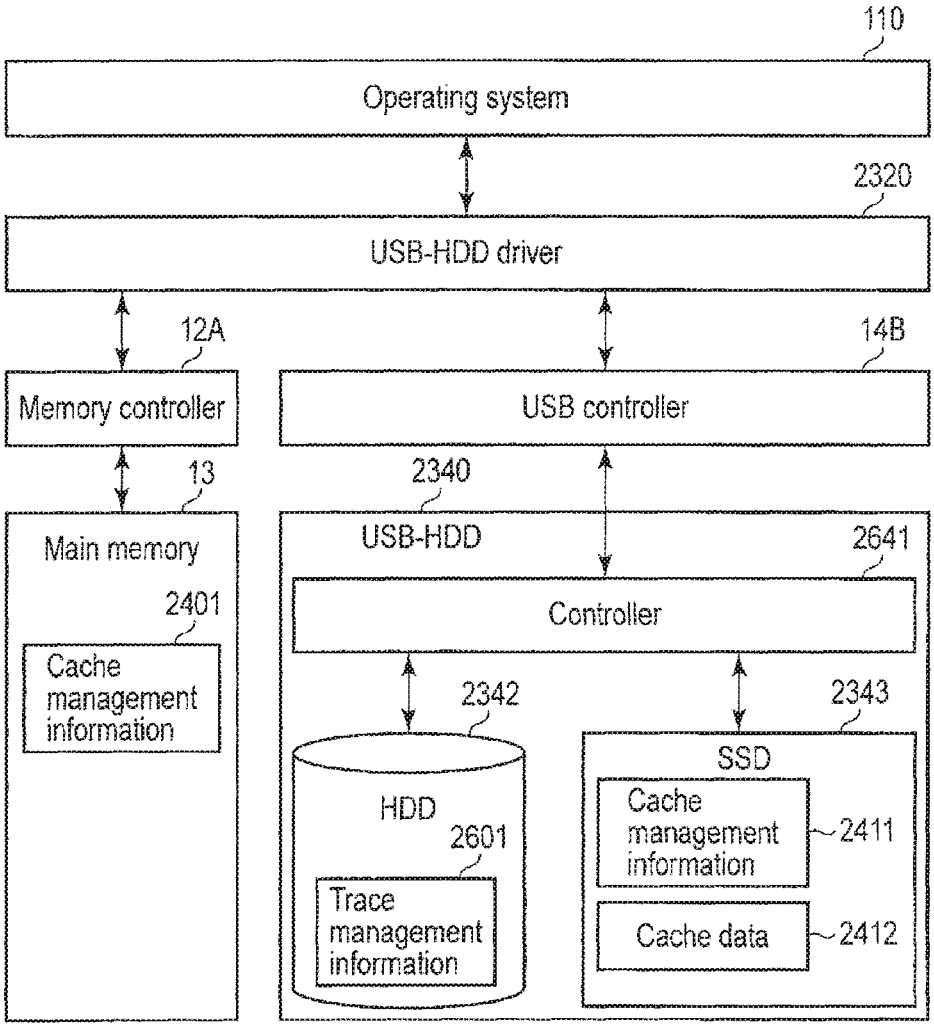
FIG. 26 is an exemplary block diagram showing an example of primary parts of an information processing apparatus according to a ninth embodiment.

The configurations of a USB-HDD 2340 and an information processing apparatus for controlling the USB-HDD 2340 are described with reference to FIG. 26. FIG. 26 is a block diagram showing primary parts of an information processing apparatus according to the ninth embodiment.

A cache driver 2320 is loaded into a main memory 13 when the computer is started, and starts operation. When a shutdown notification is received from an OS 110, the cache driver 2320 stores cache management information 2401 such as a cache directory in a management data area of an SSD 2343 as cache management information 2411.

When the computer is restarted, the cache driver 2320 is again loaded into the main memory 13, and starts operation. A module which controls an HDD before a cache driver such as BIOS operates may have no function to manage a cache. In this case, if data written via the module hits a cache, the cache driver does not know that the data in the HDD has been rewritten. Therefore, there is data inconsistency between the HDD and the cache.

When the USB-HDD 2340 is used in another computer, it is unknown that data in an HDD 2342 has been rewritten. Therefore, there may be data inconsistency between the HDD 2342 and the SSD 2343, so that it is necessary to invalidate all cache data.

According to the present embodiment, data learned before restart can be used without data inconsistency in such a case.

A controller 2641 of the USB-HDD 2340 has a function of tracing a write command issued from a host, and a function of managing a trace valid flag.

Figure 27:
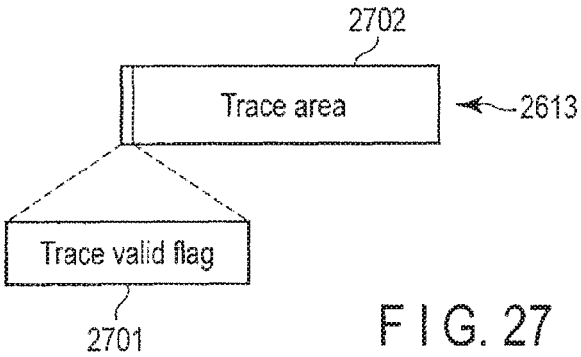
FIG. 27 is an exemplary diagram showing an example of trace management information according to the ninth embodiment.

The controller 2641 records, for example, trace data and the trace valid flag in trace management information 2613 provided in the HDD 2342. As shown in FIG. 27, the trace management information 2613 has a trace valid flag 2701 and a trace area 2702. The trace management information 2613 can be referred to and changed by both the controller 2641 and the cache driver 2320. if recorded in a nonvolatile storage device, a trace result and the trace valid flag do not have to be recorded in the SSD 2343.

The initial value of the trace valid flag 2701 is "OFF". When the value of the trace valid flag is "ON", the controller 2641 records a target address of the write command in the trace area 2702. When the trace area is full, the controller 2641 sets the value of the trace valid flag to "OFF".

The cache driver 2320 refers to the value of the trace valid flag 2701 at the start of operation. When the value is "OFF", the cache driver 2320 judges that the consistency of the cache cannot be ensured, and the cache driver 2320 initializes the cache management information 2401 in the main memory 13 so that nothing is recorded in cache data 2412. When the value is "ON", the cache driver 2320 refers to the trace data in the trace area 2702. When an address written in a period in which the cache driver is not in operation hits the cache, the cache driver 2320 invalidates the cache data. After completing processing for all the trace data, the cache driver 2320 sets the value of the trace valid flag to "OFF". When the cache driver 2320 receives a shutdown notification from the OS 110 and shutdown processing is completed, and when processing for safe removal of the USB-HDD 2340 is completed, the cache driver 2320 sets the trace valid flag to "ON".

Figure 28:
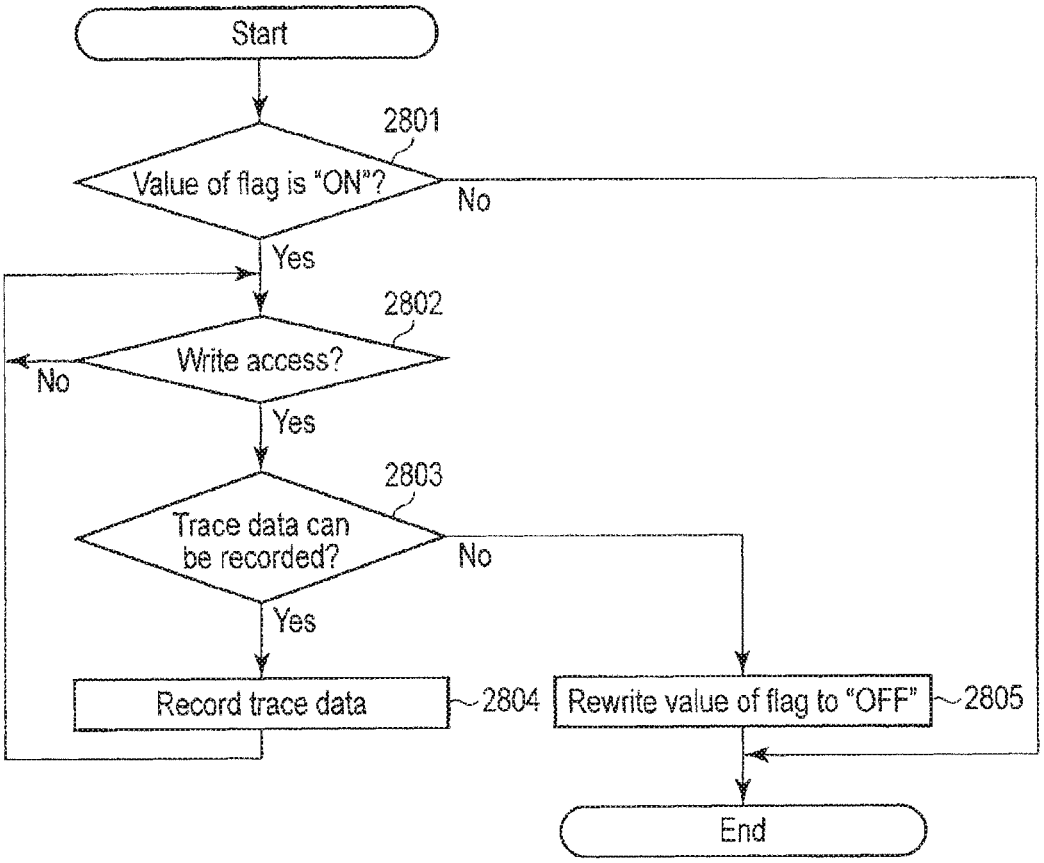
FIG. 28 is an exemplary flowchart showing an example of the procedure of processing performed by a controller according to the ninth embodiment.

The procedure of processing performed by the controller is described with reference to the flowchart in FIG. 28.

The controller 2641 refers to the value of the trace valid flag 2701 at the start of operation, and judges whether the value is "ON" (block 2801). When judging that the value is "ON" (Yes in block 2801), the controller 2641 judges whether access, if any, is write access (step 2802). When judging that the access is write access (Yes in block 2802), the controller 2641 judges whether trace data can be recorded in the trace area 2702 (block 2803). When judging that the trace data can be recorded (Yes in block 2803), the controller 2641 records the trace data in the trace area 2702 (block 2803). When judging that the trace data cannot be recorded (No in block 2803), the controller 2641 rewrites the value of the trace valid flag 2701 to "OFF" (block 2805).

Figure 29:
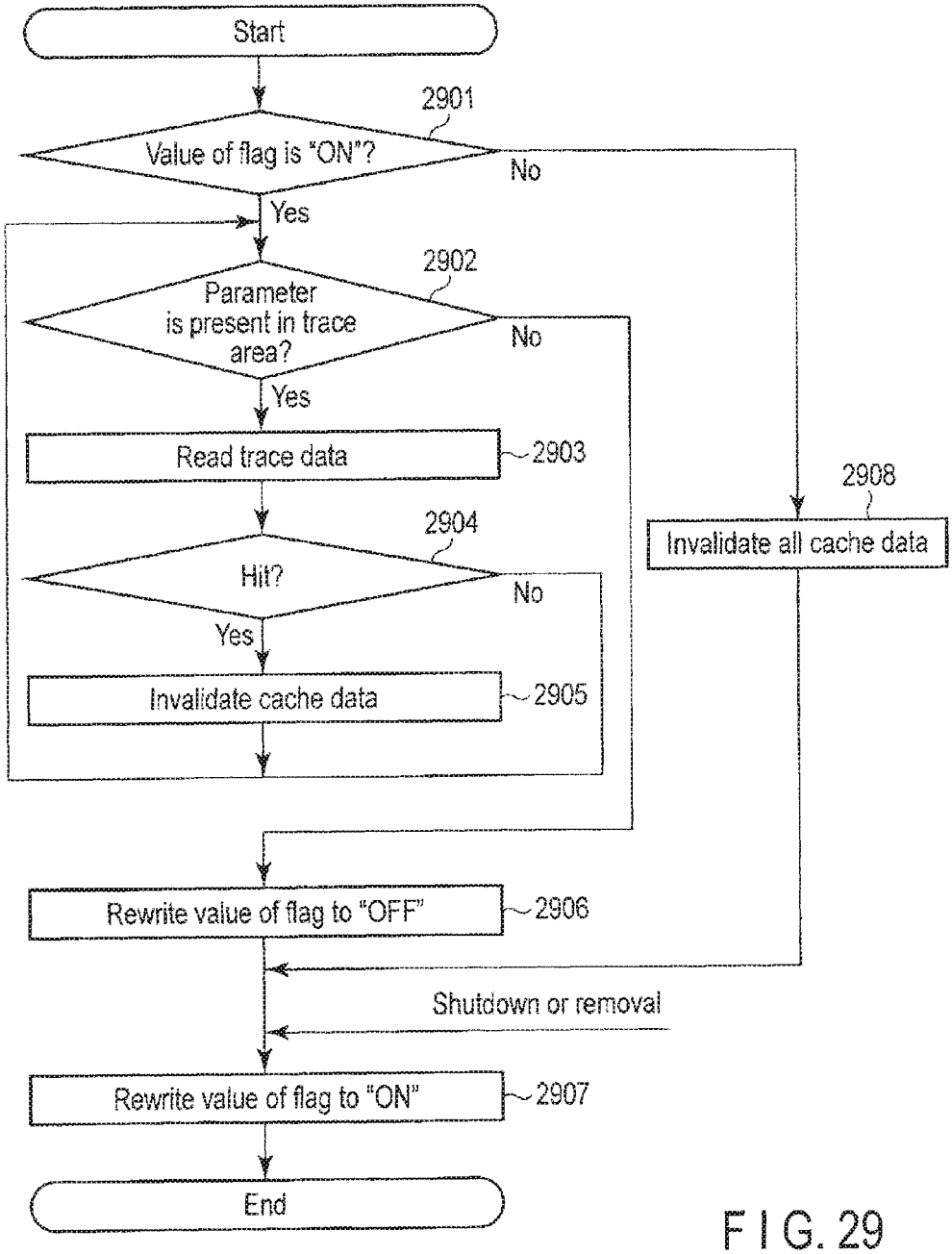
FIG. 29 is an exemplary flowchart showing an example of the procedure of processing performed by a cache driver according to the ninth embodiment.

Now, the procedure of processing performed by the cache driver 2320 is described with reference to the flowchart in FIG. 29.

The cache driver 2320 refers to the value of the trace valid flag 2701 at the start of operation, and judges whether the value is "ON" (block 2901). When judging that the value is not "ON" (No in block 2901), the cache driver 2320 initializes the cache management information 2401 in the main memory 13 so that nothing is recorded in cache data 2412 (block 2908). When judging that the value is "ON" (Yes in block 2901), the cache driver 2320 reads the cache management information 2411 in the SSD 2343 into the area of the cache management information 2401 of the main memory 13, and processes trace data. The cache driver 2320 judges whether there is any trace data that is not read in the trace area 2702 (block 2902). When judging that there is such trace data (Yes in block 2902), the cache driver 2320 reads one item of trace data from the trace area 2702 (block 2903). The cache driver 2320 judges by the cache management information 2401 whether data corresponding to an address recorded in the trace data hits the cache data (block 2904). When judging that the data hits the cache data (Yes in block 2904), the cache driver 2320 destroys tag data corresponding to the trace data (block 2905). When judging that the data misses the cache data (No in block 2904), the cache driver 2320 sequentially performs processing from block 2902 after block 2905. When judging that there is no trace data (No in block 2902), the cache driver 2320 rewrites the value of the trace valid flag 2701 to "OFF" (block 2906). After block 2906, when the shutdown processing is completed or when the processing for safe removal of the USB-HDD 2340 is completed, the cache driver 2320 rewrites the value of the trace valid flag 2701 to "ON" (block 2907).

Figure 30:
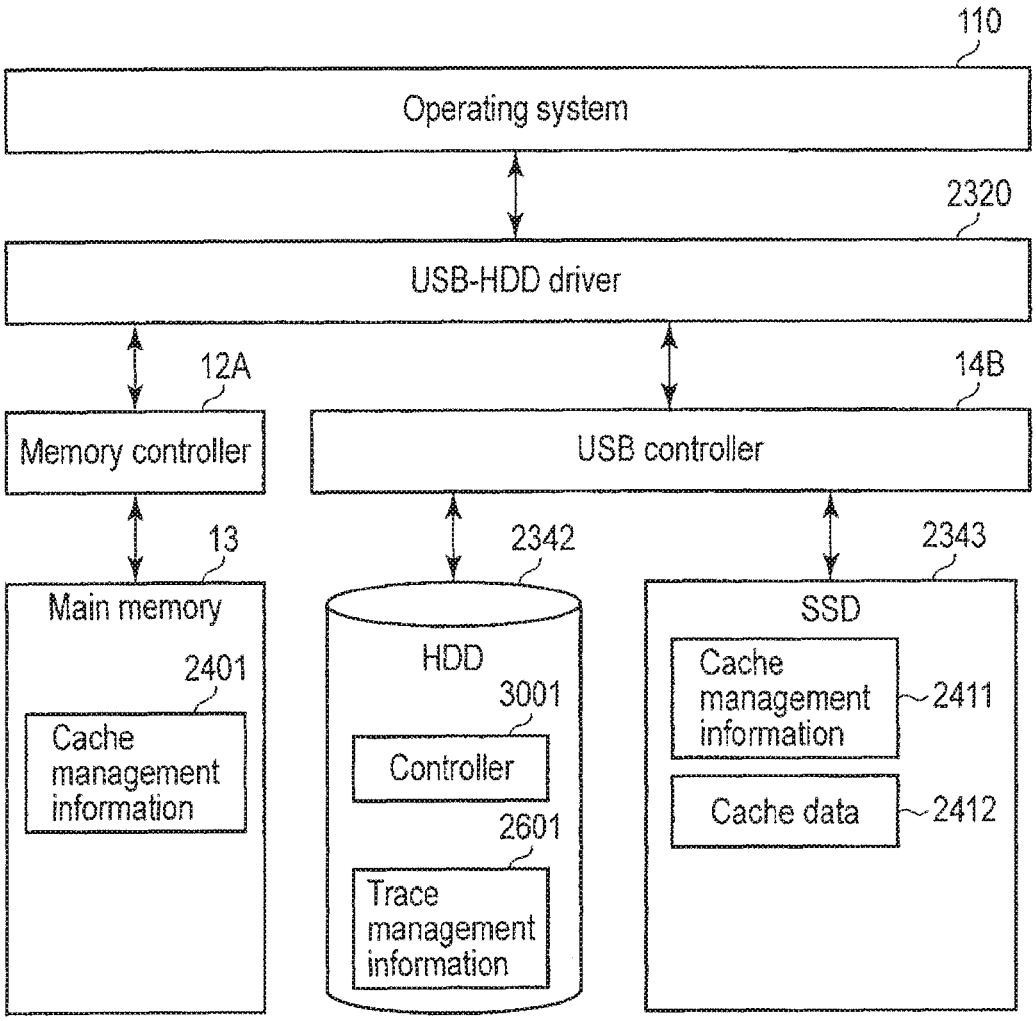
FIG. 30 is an exemplary block diagram showing an example of primary parts of an information processing apparatus according to a modification of the ninth embodiment.

The present embodiment can be used not only to operate a hybrid HDD but also to operate a cache by the HDD 2342 and the SSD 2343 that are independent as shown in FIG. 30. In this case, a controller 3001 which has a function of tracing a write command issued from the host, and a function of managing a nonvolatile trace valid flag is provided in the HDD 2342.

In the present embodiment, the command to write in the HDD is traced, so that this HDD is used in an environment in which the cache driver 2320 is not in operation. Even when some data are rewritten, the rewritten data alone is invalidated without invalidating the whole cache, and other data can be valid.

Tenth Embodiment

Write Trace+Identifier

In the present embodiment, a function is added to an HDD control module. Thus, even after the restart of a computer system, data learned before the restart can be used. Data consistency" is ensured even if an HDD is rewritten by another computer system that has the same cache driver.

Figure 31:
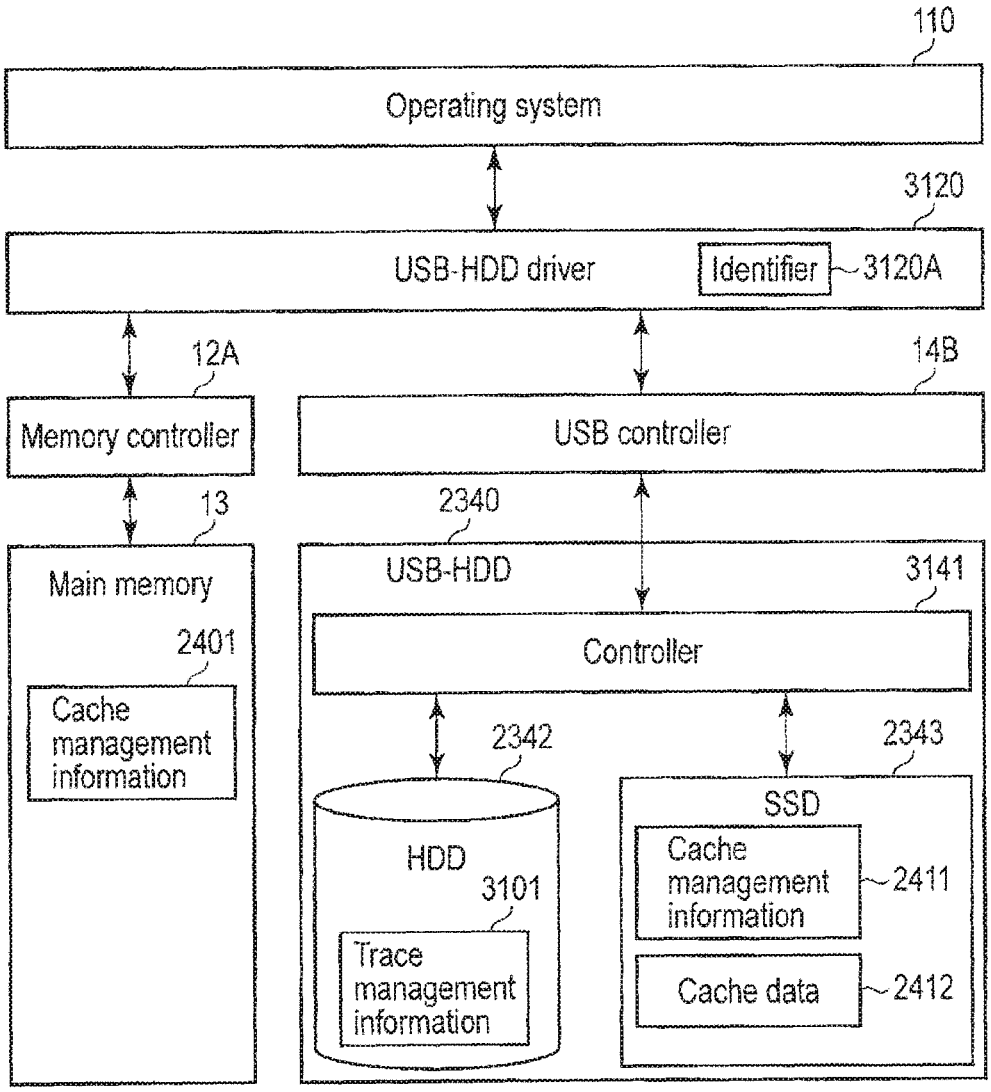
FIG. 31 is an exemplary block diagram showing an example of primary parts of an information processing apparatus according to a tenth embodiment.

Now, the configurations of a USB-HDD 2340 and an information processing apparatus for controlling the USB-HDD 2340 are described with reference to FIG. 31. FIG. 31 is a block diagram showing primary parts of the information processing apparatus according to the tenth embodiment.

A controller 3141 of the USB-HDD 2340 has a function of tracing a write command issued from a host, and a function of managing a cache driver identifier.

Figure 32:
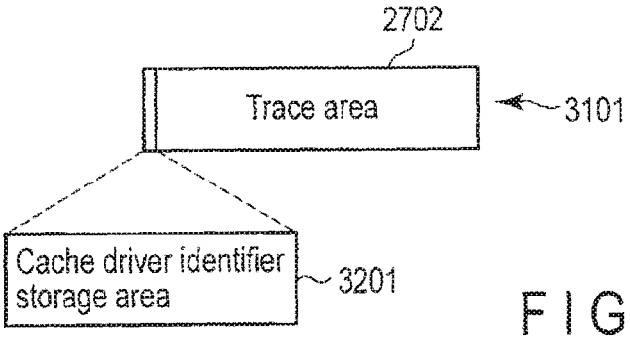
FIG. 32 is an exemplary diagram showing an example of trace management information according to the tenth embodiment.

The controller 3141 records, for example, trace data and the cache driver identifier in trace management information 3101 provided in an HDD 2342. As shown in FIG. 32, the trace management information 3101 has a cache driver identifier storage area 3201 and a trace area 2702. When the cache driver identifier storage area 3201 is clear, this means that no cache driver identifier is stored. The initial value of the cache driver identifier storage area 3201 indicates a clear state. The trace management information 3101 can be referred to and changed by both the controller 3141 and a cache driver 3120. If recorded in a nonvolatile storage device, a trace result and the trace valid flag do not have to be recorded in the hard disk drive 2342.

When the cache driver identifier storage area 3201 is not clear, the controller 3141 records a target address of a write command in the trace area 2702. When the trace area 2702 is full, the cache driver identifier storage area 3201 is cleared.

The cache driver 3120 generates a unique identifier 3120A for identifying itself. Even the same cache driver has different identifiers if this cache driver operates in different computers. For example, the cache driver 3120 generates the identifier 3120A on the basis of the installation time of the cache driver 3120. The cache driver 3120 also generates the identifier 3120A on the basis of the ID of the HDD in which an operating system is installed. The cache driver 3120 also generates the identifier 3120A on the basis of the ID of the computer. The cache driver 3120 also generates the identifier 3120A on the basis of the ID of the operating system of the cache driver 3120. The cache driver 3120 also generates the identifier 3120A on the basis of fingerprint data used by the operating system of the cache driver 3120 to indicate the fingerprint of the user.

The cache driver 3120 refers to the cache driver identifier in the cache driver identifier storage area 3201 and the cache driver identifier 3120A in the driver 3120 at the start of operation, and judges whether the two identifiers correspond to each other. When the two identifiers do not correspond to each other, the cache driver 3120 judges that cache consistency cannot be ensured, and destroys all the contents of the cache.

When the two identifiers correspond to each other, the cache driver 3120 refers to the trace data in the trace area 2702. When an address written in a period in which the cache driver is not in operation hits the cache, the cache driver 3120 invalidates the cache data. After completing processing for all the trace data, the cache driver 3120 clears the cache driver identifier storage area 3201. When the cache driver 3120 receives a shutdown notification from an OS 110 and shutdown processing is completed, and when processing for safe removal of the USB-HDD 2340 is completed, the cache driver 3120 writes its identifier 3120A in the cache driver identifier storage area 3201.

Figure 33:
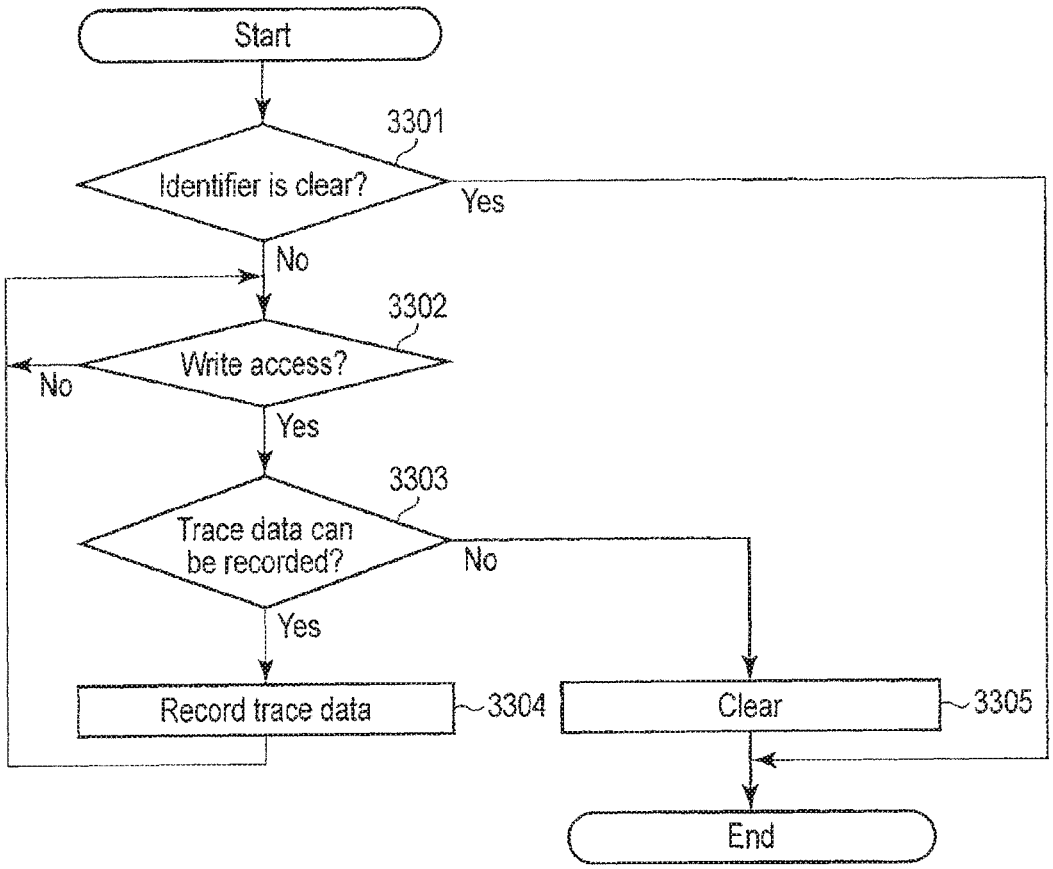
FIG. 33 is an exemplary flowchart showing an example of the procedure of processing performed by a controller according to the tenth embodiment.

The procedure of processing performed by the controller 3141 is described with reference to the flowchart in FIG. 33.

The controller 3141 judges whether the identifier is clear at the start of operation (block 3301). When judging that the identifier is not clear (No in block 3301), the controller 3141 judges whether access, if any, is write access (block 3302). When judging that the access is write access (Yes in block 3302), the controller 3141 judges whether trace data can be recorded in the trace area 2702 (block 3303). When judging that the trace data can be recorded (Yes in block 3303), the controller 3141 records the trace data in the trace area 2702 (block 3303). When judging that the trace data cannot be recorded (No in block 3303), the controller 3141 clears the value of the cache driver identifier storage area 3201 (block 3305).

Figure 34:
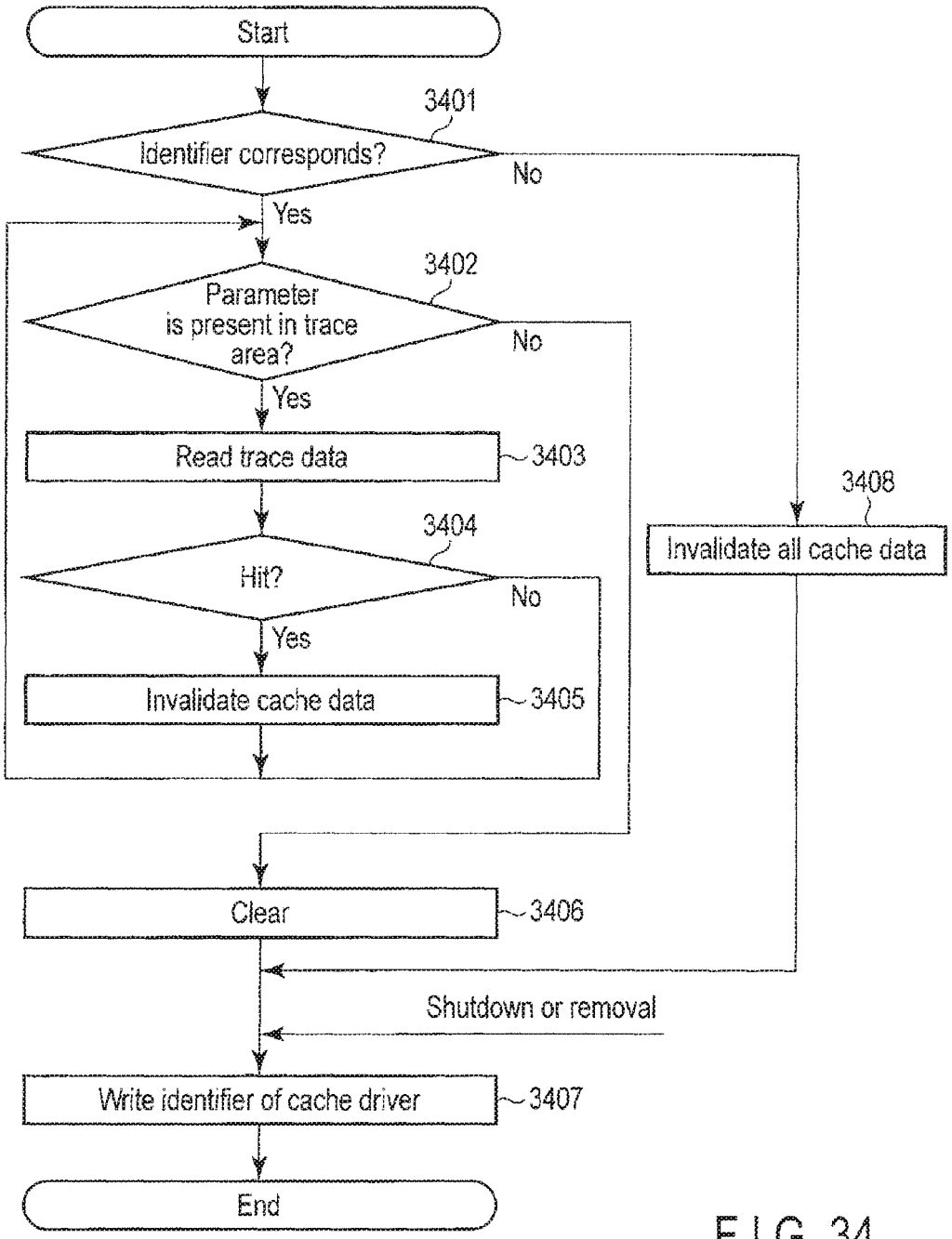
FIG. 34 is an exemplary flowchart showing an example of the procedure of processing performed by a cache driver according to the tenth embodiment.

Now, the procedure of processing performed by the cache driver 3120 is described with reference to the flowchart in FIG. 34.

The cache driver 3120 judges whether the value of the identifier 3120A corresponds to the value stored in the cache driver identifier storage area 3201 at the start of operation (block 3401). When judging that the values do not correspond to each other (No in block 3401), the cache driver 3120 initializes cache management information 2401 in a main memory 13 so that nothing is recorded in cache data 2412 (block 3408). When judging that the values correspond to each other (Yes in block 3401), the cache driver 3120 reads the cache management information in an SSD 2343 into the area of the cache management information 2401 of the main memory 13, and processes trace data. The cache driver 3120 judges whether there is any trace data in the trace area 2702 (block 3402). When judging that there is trace data (Yes in block 3402), the cache driver 3120 reads one item of trace data from the trace area 2702 (block 3403). The cache driver 3120 judges by the cache management information 2401 whether data corresponding to an address recorded in the trace data hits the cache data (block 3404). When judging that the data hits the cache data (Yes in block 3404), the cache driver 3120 destroys tag data corresponding to the trace data (block 3405). When judging that the data does not hit the cache data (No in block 3404), the cache driver 3120 sequentially performs processing from block 3402 after block 3405. When judging that there is no trace data (No in block 3402), the cache driver 3120 clears the data in the cache driver identifier storage area 3201 (block 3406). After block 3406 and after block 3408, when the shutdown processing is completed or when the processing for safe removal of the USB-HDD 2340 is completed, the cache driver 3120 writes the value of the identifier 3120A into the cache driver identifier storage area 3201 (block 3407).

The ninth embodiment is effective when the HDD is alternately used in a computer in Which the cache driver is in operation and in another computer in which the cache driver is not in operation. However, it has been impossible to ensure data consistency when there are computers having the same cache driver and the HDD is alternately used in those computers. For example, the HDD is connected to a computer A, and when the HDD is safely removed, the flag is turned on. However, if this HDD is connected to a computer B, the flag is turned off when the cache driver starts operation, so that write access is not traced. If this HDD is safely removed from the computer B and connected to the computer A, the flag is on and there is no trace data despite the data written in the computer B.

According to the present embodiment, the unique identifier generated by the driver is used for management instead of the flag. Therefore, cache consistency can be maintained even if the HDD is moved among computers having cache drivers.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:

a storage device comprising a controller, a first nonvolatile storage module, and a second nonvolatile storage module whose access speed is higher than an access speed of the first nonvolatile storage module;

a volatile memory; and a processor *outside of the storage device and* configured to*:* execute an operating system and a cache driver that are loaded into the volatile memory, the cache driver using at least part of an area in the second nonvolatile storage module as a cache for the first nonvolatile storage module*;*

*store, in the volatile memory, first cache management information to manage cache data cached in the second nonvolatile storage module;*

*at shutdown of the information processing apparatus, request the controller to write the first cache management information into the second nonvolatile storage module as second cache management information,*

*wherein, at startup of the information processing apparatus, the controller uses, by referring to the second cache management information, the at least part of the area in the second nonvolatile storage module as the cache for the first nonvolatile storage module.*

[2. The apparatus of claim 1, wherein the cache driver is configured to store, in the volatile memory, first cache management information to manage cache data stored in the second nonvolatile storage module, and the cache driver is configured to store, in the first nonvolatile storage module or the second nonvolatile storage module as second cache management information, the first cache management information stored in the volatile memory at shutdown of the apparatus.]

3. The apparatus of [claim 2] *claim 1*, wherein the controller is configured to execute read cache control processing and cache management information managing processing, using at least part of the area in the second nonvolatile storage module as a read cache device of the first nonvolatile storage module based on the second cache management information at *the* startup of the apparatus.

4. The apparatus of claim 3. wherein the cache driver is configured to issue an operation start notification to the controller after the cache driver is loaded into the volatile memory, and the controller is configured to stop the execution of the read cache control processing and the cache management information managing processing in response to the operation start notification.

5. The apparatus of claim 3, wherein the controller is configured to write, into the second cache management information, data to identify data for which a read access request is made at the startup of the apparatus.

6. The apparatus of claim 5, wherein the cache driver is configured to rewrite the data which identifies the data for which the read access request is made at the startup to a condition in which the read access request is not made when a write access request is issued to [the] *an* area where the data for which the read access request is once made at *the* startup is stored.

7. The apparatus of [claim 2] *claim 1*, wherein the controller is configured to write a first value into one of the *first and second* nonvolatile storage [module] *modules* at normal shutdown of the apparatus, and the cache driver is configured to judge whether the first value is written in the *one of the first and second* nonvolatile storage [module] *modules* after the cache driver is loaded into the volatile memory, and the cache driver is configured to rewrite the first value to a second value when the cache driver judges that the first value is written, and the cache driver is configured to invalidate the cache data in the second nonvolatile storage module when the cache driver judges that the first value is not written.

8. The apparatus of claim 1, wherein the cache driver is configured to use at least part of the area in the second nonvolatile storage module as a cache for the first nonvolatile storage module and [the] *a* second storage device when the second storage device is connected to the apparatus.

9. The apparatus of claim 1, wherein the operating system is configured to recognize the first nonvolatile storage module and the second nonvolatile storage module as independent storage devices.

10. The apparatus of claim 1, wherein the first nonvolatile storage module comprises a hard disk drive, and the second nonvolatile storage module comprises a flash memory.

11. An information processing apparatus comprising:

a first nonvolatile storage device;

a second nonvolatile storage device whose access speed is higher than an access speed of the first nonvolatile storage device;

a volatile memory;

*a controller;* and a processor configured to*:* execute an operating system and a cache driver that are loaded into the volatile memory, the cache driver using at least part of an area in the second nonvolatile storage device as a cache for the first nonvolatile storage device*;*

*store, in the volatile memory, first cache management information to manage cache data cached in the second nonvolatile storage module;*

*at shutdown of the information processing apparatus, request the controller to write the first cache management information into the second nonvolatile storage module as second cache management information,*

*wherein, at boot-up of the information processing apparatus, the controller uses, by referring to the second cache management information, the at least part of the area in the second nonvolatile storage module as the cache for the first nonvolatile storage module.*

12. The apparatus of claim 11, further comprising an external additional bus, wherein the second nonvolatile storage device is connected to the external additional bus.

13. The apparatus of claim 11, wherein the first nonvolatile storage device comprises [a] *the* controller, the controller is configured to record, in the first nonvolatile storage device, an address of data for which a write access request is made when a value stored in a flag area of the first nonvolatile storage device is a first value, the controller is configured to rewrite the first value in the flag area to a second value when the address is not allowed to be recorded in the first nonvolatile storage device, the cache driver is configured to judge whether the first value is recorded in the flag area at start of operation of the cache driver, the cache driver is configured to invalidate all the cache data in the second nonvolatile storage device when the cache driver judges that the first value is not recorded, the cache driver is configured to invalidate the cache data in the second nonvolatile storage device in accordance with the address of the data for which the write access request is made when the cache driver judges that the first value is recorded, the cache driver is configured to rewrite the value in the flag area to the second value after the cache driver invalidates all the cache data in the second nonvolatile storage device or after the cache driver invalidates the cache data in the second nonvolatile storage device in accordance with the address of the data for which the write access request is made, and the cache driver is configured to record the first value in the flag area at *the* shutdown of the apparatus or at [the] completion of processing of the operating system associated with normal removal of the second nonvolatile storage device.

14. The apparatus of claim 11, wherein the controller is configured to record, in the first nonvolatile storage device, an address of data for which a write access request is made when an identifier recorded in an identifier storage area of the first nonvolatile storage device is a valid value, the controller is configured to set [the] *a* value in the identifier storage area to an invalid value when the address is not allowed to be recorded in the first nonvolatile storage device, the cache driver is configured to generate the identifier, the cache driver is configured to judge whether the identifier stored in the identifier storage area and the generated identifier correspond to each other at the start of operation of the cache driver, the cache driver is configured to invalidate all the cache data in the second nonvolatile storage device when the cache driver judges that *the identifier stored in* the identifier storage area and the *generated* identifier do not correspond to each other, the cache driver is configured to invalidate the cache data in the second nonvolatile storage device in accordance with the address of the data for which the write access request is made when the cache driver judges that *the identifier stored in* the identifier storage area and the *generated* identifier correspond to each other, the cache driver is configured to set the value in the *identifier storage* area to an invalid value after the cache driver invalidates all the cache data in the second nonvolatile storage device or after the cache driver invalidates the cache data in the second nonvolatile storage device in accordance with the address of the data for which the write access request is made, and the cache driver is configured to record the identifier in the identifier storage area at *the* shutdown of the apparatus or at [the] completion of processing of the operating system associated with normal removal of the second nonvolatile storage device.

15. The apparatus of claim 11, wherein the first nonvolatile storage device comprises a hard disk drive, and the second nonvolatile storage device comprises a flash memory.

[16. A cache control method of an information processing apparatus which comprises a storage device, the storage device comprising a controller, a first nonvolatile storage module, and a second nonvolatile storage module whose an access speed is higher than an access speed of the first nonvolatile storage module, the method comprising:

executing, by a processor which executes an operating system, a cache driver which uses at least part of an area in the second nonvolatile storage module as a cache for the first nonvolatile storage module.]

* * * * *